United States Patent
Meingast

(10) Patent No.: US 11,417,102 B1
(45) Date of Patent: Aug. 16, 2022

(54) ANOMALOUS PATH DETECTION WITHIN CAMERAS' FIELDS OF VIEW

(71) Applicant: GOOGLE LLC, Mountain View, CA (US)

(72) Inventor: Marci Meingast, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/894,541

(22) Filed: Jun. 5, 2020

(51) Int. Cl.
*G06V 20/52* (2022.01)
*G06K 9/62* (2022.01)
*G06V 40/20* (2022.01)

(52) U.S. Cl.
CPC .......... *G06V 20/52* (2022.01); *G06K 9/6257* (2013.01); *G06V 40/23* (2022.01)

(58) Field of Classification Search
CPC .......... G06K 9/00771; G06K 9/00342; G06K 9/6257
USPC .......................................................... 382/103
See application file for complete search history.

(56) References Cited

U.S. PATENT DOCUMENTS

| | | | |
|---|---|---|---|
| 2008/0198231 A1 | 8/2008 | Ozdemir et al. | |
| 2011/0044498 A1* | 2/2011 | Cobb | G06T 11/206 382/103 |
| 2017/0286781 A1* | 10/2017 | Xu | G06T 7/20 |
| 2019/0122522 A1 | 4/2019 | Stefanski et al. | |

OTHER PUBLICATIONS

Emmanu Varghese, "Video Anomaly Detection in Confined Areas," 7th International Conference on Advances in Computing & Communications, ICACC-2017, Aug. 22-24, 2017, Cochin, India.

* cited by examiner

*Primary Examiner* — Michael R Neff
(74) *Attorney, Agent, or Firm* — Butzel Long

(57) ABSTRACT

Systems and techniques are provided for anomalous path detection within cameras' fields of view. Video of the field of view of a camera in an environment may be received from the camera. A person may be detected in the video. Motion of the person in the video may be tracked to generate a motion path. Contextual data for the motion path may be received. The motion path and contextual data may be stored in a camera training data set. A camera model for the camera and the field of view may be generated by inputting the camera training data set to a machine learning system. The camera model for the camera and the field of view may be stored.

20 Claims, 14 Drawing Sheets

ANOMALOUS PATH DETECTION WITHIN CAMERAS' FIELDS OF VIEW

BACKGROUND

Cameras may be used to monitor areas of a structure or environment. Video from cameras may be used for a variety of purposes. Video may be displayed contemporaneously to a human viewer, who may evaluate the video for security purposes. To be useful, evaluation of video by a person may require a dedicated person or persons who view the video, which may not be feasible for most structure and environments with cameras. Motion detection may be applied to the video to determine if the video contains an image of a moving person. This may not require a person to review the video, but may only provide a limited amount of information about the video for security purposes.

BRIEF SUMMARY

According to an embodiment of the disclosed subject matter, video of a field of view of a camera in an environment may be received from the camera. A person may be detected in the video. Motion of the person in the video may be tracked to generate a motion path. Contextual data for the motion path may be received. The motion path and contextual data may be stored in a camera training data set. A camera model for the camera and the field of view may be generated by inputting the camera training data set to a machine learning system. The camera model for the camera and the field of view may be stored.

Additional video of the field of view of the camera may be received. A person may be detected in the additional video. Motion of the person in the additional video may be tracked to generate a second motion path. Second contextual data for the second motion path may be received. An indication of normal or anomalous motion path for the second motion path may be generated by inputting the second motion path and the second contextual data to the machine learning system wherein the machine learning system uses the camera model for the camera and the field of view.

In response to the indication of normal or anomalous motion path indicating that the motion path is anomalous, a notification that the motion path is anomalous may be sent to a user associated with the environment, a notification that the motion path is anomalous may be sent to a cloud computing system or hub computing device of the environment, or control signals may be generated and sent to devices or systems in the environment.

In response to the indication of normal or anomalous motion path indicating that the motion path is anomalous and at least one previously generated indication of normal or anomalous motion path indicating that at least one previous motion path is anomalous, a notification may be sent to a user associated with the environment that the field of view of the camera has changed.

Videos of fields of view of the multiple cameras may be received from multiple cameras in the environment. The camera may be one of the multiple cameras. Persons may be detected in the additional videos. Motion of the persons in the videos may be tracked to generate additional motion paths. Additional contextual data for the additional motion paths may be received. The motion path, additional motion paths, contextual data, and additional contextual data may be stored in an inter-camera training data set. An inter-camera model for the multiple cameras and fields of view may be generated by inputting the inter-camera training data set to the machine learning system. The inter-camera model for the multiple cameras and the fields of view may be stored.

Additional videos may be received from two or more of the multiple cameras. Persons may be detected in the additional videos. Motion of the persons in the additional videos may be tracked to generate additional motion paths. Additional contextual data for the additional motion paths may be received. Indications of normal or anomalous motion paths for the additional motion paths may be generated by inputting the additional motion paths and the additional contextual data to the machine learning system wherein the machine learning system uses the inter-camera model for the multiple cameras and the fields of view.

Video of a field of view of a second camera in the environment may be received from the second camera. detecting a person in the video of the field of view of the second camera. Motion of the person in the video of the field of view of the second camera may be tracked to generate a second motion path. Second contextual data for the second motion path may be received. The second motion path and second contextual data may be stored in a second camera training data set. A second camera model for the second camera and the field of view of the second camera may be generated by inputting the second camera training data set to the machine learning system. The second camera model for the second camera and the field of view of view of the second camera may be stored.

Generating the motion path may include generating a sequence of coordinates for locations of the person in sequential frames of the video or generating an image of a path of the person through the field of view of the camera.

The contextual data for the motion path may include time of day, date, identification of the person, the length of the motion path in the field of view, and the time span the motion path is in the field of view.

According to an embodiment of the disclosed subject matter, a means for receiving, receiving, from a camera in an environment, video of a field of view of the camera, a means for detecting a person in the video, a means for tracking motion of the person in the video to generate a motion path, a means for receiving contextual data for the motion path, a means for storing the motion path and contextual data in a camera training data set, a means for generating a camera model for the camera and the field of view by inputting the camera training data set to a machine learning system, a means for storing the camera model for the camera and the field of view, a means for receiving, from the camera, additional video of the field of view of the camera, a means for detecting a person in the additional video, a means for tracking motion of the person in the additional video to generate a second motion path, a means for receiving second contextual data for the second motion path, a means for generating an indication of normal or anomalous motion path for the second motion path by inputting the second motion path and the second contextual data to the machine learning system wherein the machine learning system uses the camera model for the camera and the field of view, a means for, in response to the indication of normal or anomalous motion path indicating that the motion path is anomalous, one or more of sending a notification that the motion path is anomalous to a user associated with the environment, sending a notification that the motion path is anomalous to a cloud computing system or hub computing device of the environment, and generating and sending control signals to one or more devices or systems in the environment, a means for, in response to the indication of normal or anomalous motion path indicating that the motion path is anomalous and at least one previously generated indication of normal or anomalous motion path indicating that at least one previous motion path is anomalous, sending a notification to a user associated with the environment that the field of view of the camera has changed, a means for receiving, from multiple cameras in the environment, videos of fields of view of the multiple cameras, wherein the camera is one of the multiple cameras, a means for detecting persons in the additional videos, a means for tracking motion of the persons in the videos to generate additional motion paths, a means for receiving additional contextual data for the additional motion paths, a means for storing the motion path, additional motion paths, contextual data, and additional contextual data in an inter-camera training data set, a means for generating an inter-camera model for the multiple cameras and fields of view by inputting the inter-camera training data set to the machine learning system, a means for storing the inter-camera model for the multiple cameras and the fields of view, a means for receiving additional videos from two or more of the multiple cameras, a means for detecting persons in the additional videos, a means for tracking motion of the persons in the additional videos to generate additional motion paths, a means for receiving additional contextual data for the additional motion paths, a means for generating indications of normal or anomalous motion paths for the additional motion paths by inputting the additional motion paths and the additional contextual data to the machine learning system wherein the machine learning system uses the inter-camera model for the multiple cameras and the fields of view, a means for receiving, from a second camera in the environment, video of a field of view of the second camera, a means for detecting a person in the video of the field of view of the second camera, a means for tracking motion of the person in the video of the field of view of the second camera to generate a second motion path, a means for receiving second contextual data for the second motion path, a means for storing the second motion path and second contextual data in a second camera training data set, a means for generating a second camera model for the second camera and the field of view of the second camera by inputting the second camera training data set to the machine learning system, and a means for storing the second camera model for the second camera and the field of view of view of the second camera, are included.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1A:
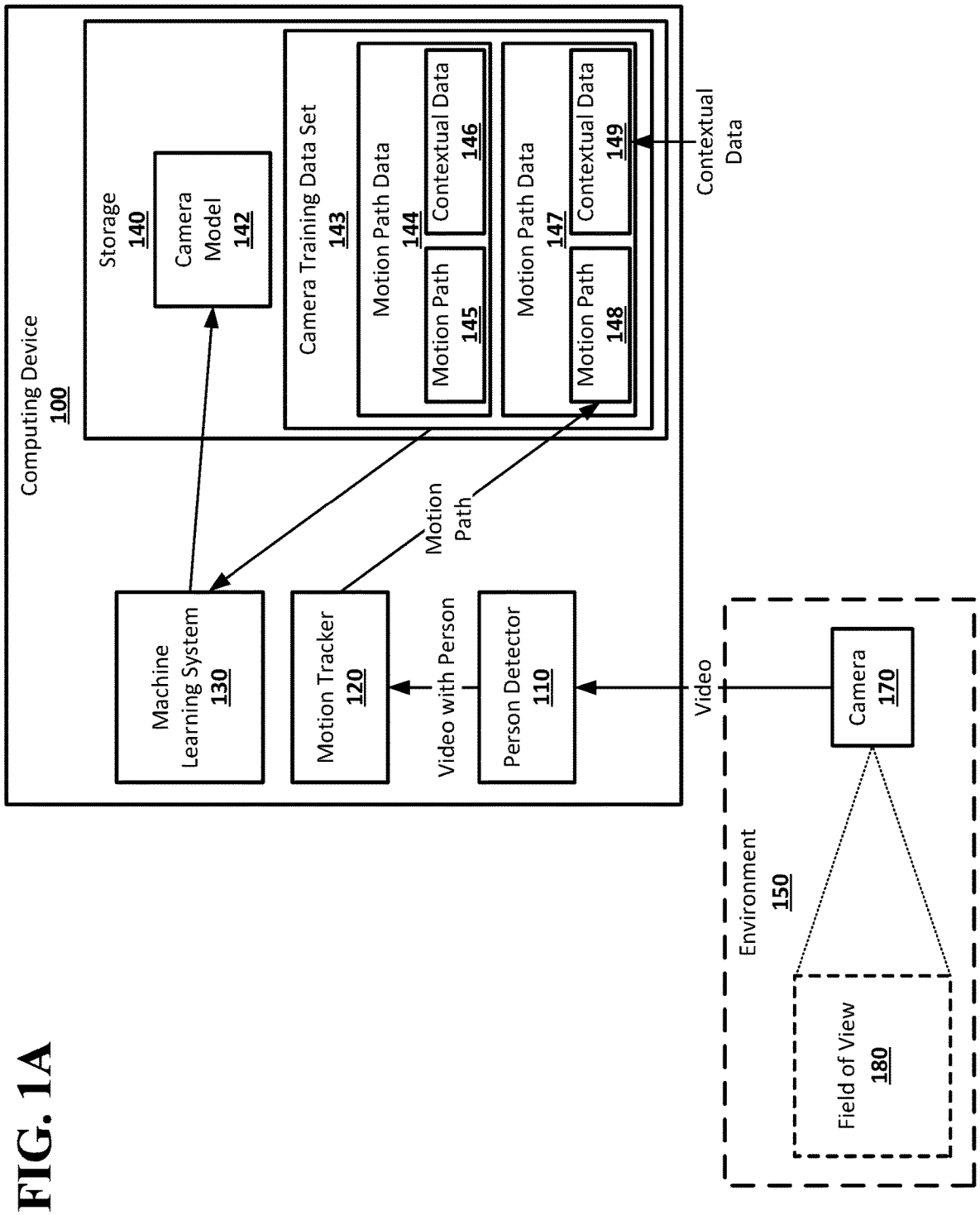
FIG. 1A shows an example system and arrangement suitable for anomalous path detection within cameras' fields of view according to an implementation of the disclosed subject matter.

According to embodiments disclosed herein, anomalous path detection within cameras' fields of view may allow for the detection of persons, objects, or animals, taking anomalous paths through an environment within the field of view of a single camera and across the fields of view of multiple cameras. Data from person detection and motion tracking applied to video from a camera in an environment may be used as input to a machine learning system, which may be trained to identify the normal paths of motion of persons within the field of view of the camera, generating a model. The model may then be applied by the machine learning system to real-time data from person detection and motion tracking applied to real-time video from the camera to distinguish between normal and anomalous paths of motion of persons within the field of view of the camera. This may allow for notifications to be sent to a user when a person travelling an anomalous path of motion in the camera's field of view is detected. Data from person detection and motion tracking applied to video from multiple cameras in the environment may be used as input to a machine learning system, which may be trained to identify the normal paths of motion of persons across the fields of view of multiple cameras, generating a model. The model may then be applied by the machine learning system to real-time data from person detection and motion tracking applied to real-time video from the multiple cameras to distinguish between normal and anomalous paths of motion of persons across the fields of view of the multiple cameras. This may allow for a reduction in notifications of a person detected in the fields of view of multiple cameras when they are detected following a normal path of motion across the fields of view, determination of whether someone is approaching or moving away from the environment, and determination of gaps in the coverage of the environment by the fields of view of the multiple cameras.

An environment may include a number of cameras. The environment may be, for example, a home, office, apartment, or other structure, outdoor space, or combination of indoor and outdoor spaces. The cameras may be distributed throughout the environment, and may have fields of view that encompass various portions of the environment. For example, a house may include cameras with fields of views that include entryways to the house, such as doors and garage doors, and areas outside of the house, such as the front yard, back yard, and side outside areas. For example, a house may include a camera with a field of view that includes an area outside of the front door of the house, a camera with a field of view that includes an area inside the front door of the house, a camera with a field of view that includes an area of a portion of the backyard of the house. The fields of view of different cameras in the same environment may have be entirely separate, or some of the fields of view may overlap.

Video from a camera may be used to generate data for training a machine learning system to detect normal and anomalous paths in the field of view of the camera. Person detection may be applied to each frame of video generated by the camera to detect whether the video includes a person in the camera's field of view. Motion tracking may be applied to the frames of video in which a person was detected. The motion tracking may be used to generate a motion path of a detected person across the field of view of the camera. The motion path may be stored as part of a training data set for the camera along with contextual data about the motion path. Contextual data may include, for example, the date the motion path was detected, including whether the date is a holiday, the times and locations within the field of view of the camera that the motion path enters and exits the field of view, the length of the motion path in the field of view, the time span the motion path is in the field of view of the camera, and an identity of the person responsible for the motion path determined in any suitable manner, including, for example, through facial recognition. The contextual data may be determined through access to outside computing services, such as, for example, a service that provides time and date or performs facial recognition on videos. The contextual data may also include data from sensors other than the camera, including, for example, data from motion sensors near the camera in the environment, data from entryway sensors on doors and windows in the environment, data from a security system that monitors the environment including, for example, whether the security system is in a home mode, away mode, or vacation mode, and whether the security system is in an armed state or disarmed state. A motion path may be stored in any suitable format. For example, a motion path may be stored as an image of the motion path through the field of view of camera, or may be stored as sequential coordinates or in a vector graphics format.

Data for training the machine learning system may be generated over any suitable period of time, and may include any number of motion paths detected in the field of view of the camera. The data generated from a camera may be generated while the camera has the same field of view. If the field of view of the camera is changed, for example, due to the camera being moved, data generated before the field of view was changed may not be used to train a model for the camera. The motion paths used to train the machine learning system may need to be generated while the camera has the same field of view. The data for training the machine learning system may be labeled, for example, through the use of a heuristic model, statistical model, or other classifier or clustering model, to identify normal and anomalous motion paths to allow use of the data in supervised training of a machine learning system. The data for training the machine learning system may also be unlabeled and may be used in unsupervised training of the machine learning system.

A machine learning system may be trained using the data generated by a camera to generate a model for the camera that may be used to identify normal and anomalous paths of motion in the field of view of the camera. For example, motion paths and contextual data from a camera in an environment may be input to a machine learning system. The machine learning system may be, for example, a recurrent neural network, including a deep learning neural network. In some implementations, if smaller amounts of data have been generated from the video from the camera, the machine learning system may be a support vector machine or a regression model. Supervised learning may be used to train the machine learning system when the training data is labeled, and unsupervised learning may be used when the training data is unlabeled. The training of the machine learning system to generate the model may be offline training, and may occur after any suitable amount of data for the training has been generated from the video from the camera. The model generated by training the machine learning system may be a model to be used by that machine learning system. For example, the model may be a set of weights for a deep learning neural network.

The model generated by training the machine learning system for a camera may be used to identify normal and anomalous motions paths in the field of view of the camera in real-time. Person detection may be applied to each frame of video generated by the camera, as the frame is generated, to detect whether there is a person in the camera's field of view. When a person is initially detected in the camera's field of view, motion tracking may be initiated. The motion tracking may continue until the person is no longer detected in the camera's field of view. The motion tracking may be used to generate a motion path for the detected person. The motion path and associated contextual data, which may be of the same type as the contextual data used to train the machine learning system, may be input to the machine learning system. The machine learning system, using the model, may output an indication of whether the motion path of the person is normal or anomalous. For example, the normal motion paths in the field of view of a camera may between the top of the field of view and the bottom of the field view through the middle third of the field of view. A motion path generated from video from the camera that shows movement from the top of the field of view to the bottom of the field of view close to one of the edges of the field of view may be indicated by the machine learning system to be an anomalous motion path. A motion path that appears similar to normal motion paths for a field of view, but occurs at a time of day that is different from the times at which the normal motion paths were detected, may also be indicated by the machine learning system to be anomalous The motion path and contextual data may be input to the machine learning system at any suitable intervals. For example, the motion path and contextual data may be input to the machine learning system after every new frame of video in which the person is detected after the initial detection of the person in the field of view of the camera until the person is no longer detected in the field of view of the camera. The motion path and contextual data may be input to the machine learning system at timed intervals, such as, for example, once every second. This may result in for, example, the motion path for a person who is moving in the field of view of the camera for seven seconds before exiting the field of view being input to the machine learning system along with contextual data seven times, with each motion path being one second longer than the previous motion path. The motion path and contextual data may be input to the machine learning system only after the person has exited the field of view of the camera. This may result in the entire motion path of the person, including contextual data for an exit time and exit location, being input to the machine learning system.

The indication output by the machine learning system may be, for example, a binary indication that the motion path is either normal or anomalous, or may be a probability, such as, for example, a probability that the motion path is normal. If a motion path is input to the machine learning system multiple times, as a person is still moving within the field of view of the camera, the machine learning system may output a different indication for each time the motion path and contextual data are input. This may result in, for example, the machine learning system initially outputting an indication that a motion path is normal, and later outputting an indication that the motion path is anomalous due to changes in the motion path as the person continues moving in the field of view of the camera.

Indications output by a machine learning system of whether a motion path in a camera's field of view is normal or anomalous may be used in any suitable manner. For example, the camera may be part of a home automation and security system for an environment. An indication of an anomalous motion path in the field of view of the camera may result in a notification being sent to a user of the home automation and security system, for example, an occupant of, owner of, or person otherwise responsible for the environment. The notification may be sent in any suitable manner, such as, for example, as an MMS, SMS, email, app notification, or other form of electronic communication that may appear on a computing device, such as a phone, tablet, laptop, or wearable device, associated with the user. The notification may include the indication of an anomalous motion path, an identification of the camera, video from the camera that includes the anomalous motion path, an identification of the person responsible for the anomalous motion if available, and any other suitable data. The notification may also provide suggested actions that the user may take and controls to take those actions, such as, for example, calling law enforcement or security personnel and activating or deactivating elements of the security system of the environment including alarms and locks. An indication of an anomalous motion path in the field of view of the camera may also be used by the home automation and security system to control devices within the environment automatically, for example, changing the state of the security system from a disarmed mode to an armed mode, locking locks, and turning on lights.

Indications output by a machine learning system of whether a motion path in a camera's field of view is normal or anomalous may be also be used to determine if a camera is malfunctioning or has been moved. If the machine learning system using a model for a camera outputs a large number of indications of anomalous motion paths, and fewer indications of normal motion paths, this may indicate that the camera's field of view has changed due to the camera being moved or repositioned. A new model for the camera may need to be generated by generating more data from the camera with its new field of view and retraining the machine learning system. It may also indicate that the camera itself is malfunctioning. A user may be notified, and may determine whether the camera has been moved or repositioned or is otherwise not functioning correctly.

Each camera in an environment may have a separate model that results from training a machine learning system with data generated from video from that camera of that camera's field of view. A model may be specific to both a camera and the field of view of the camera at the time of the generation of the data used to train the machine learning system and generate the model. A model generated for a first camera may not be usable for motion paths detected in the field of view of a second camera with a different field of view than the first camera.

Computation for person detection, motion tracking, training of the machine learning system to generate a model for a camera, and the use of the model by the machine learning system to generate indications in real-time, may occur on any suitable computing device. For example, the camera itself may have sufficient computational resources to apply person detection and motion tracking to video from the camera, implement and train the machine learning system to generate the model, store the model, and use the model with machine learning system to generate indications of normal and anomalous motion paths in real-time based on video from the camera.

Computation may also be performed on separate computing device, such as, for example, a hub computing device. The hub computing device may be any suitable computing device for managing cameras, sensors, and other systems, such as security and automation systems, within the environment. The hub computing device may be, for example, a controller for the environment. For example, the hub computing device may be or include a thermostat, security hub, or other computing device located within the environment. The hub computing device also may be another computing device within the environment or may be a separate computing device dedicated to managing the environment that may be connected to devices in the environment through, for example, the Internet. The hub computing device may be connected, through any suitable wired, wireless, local, and wide area connections, to a number of sensors and controllable devices distributed throughout an environment. For example, the hub computing device, sensors, and other components of the structure may be connected in a mesh network. Some of the sensors may, for example, be motion sensors, including passive infrared sensors used for motion detection, light sensors, cameras, microphones, entryway sensors, light switches, as well as mobile device scanners that may use Bluetooth, WiFi, RFID, or other wireless devices as sensors to detect the presence of devices such as phones, tablets, laptops, or fobs. Sensors may be distributed individually or may be combined with other sensors in sensor devices. For example, a sensor device may include a low power motion sensor and a light sensor, or a microphone and a camera, or any other combination of available sensors.

Computation may also be performed by ambient computing, using computational resources of computing devices throughout the environment that may or may not include a hub computing device. For example, an environment may include a number of devices, such as sensors, controllers, and audio and video equipment, that may be part of a security and automation system and may include computational resources.

Computation may also be performed by a cloud computing system. The cloud computing system may include any number of computing devices that are remote from the environment and may be accessible through a wide area network connection such as the Internet. The cloud computing system may be in communication with the cameras directly, or with a hub computing device of the environment that may in turn be in communication with the cameras.

Data, such as video from the cameras, the results of person detection, the motion paths, and the contextual data, may be sent to any computing device that may perform computation for any of person detection, motion tracking, training of the machine learning system to generate the model, and using the model with the machine learning system to generate indications of anomalous and normal motion paths. The data may be sent in any suitable manner, and computation may be performed using any number of computing devices, including the cameras, a hub computing device, a cloud computing system, and other computing devices in the environment. For example, a camera may perform person detection and motion tracking, and may transmit the motion paths generated by the use of motion tracking to a hub computing device, which may use the motion paths and contextual data to train the machine learning system and generate a model for the camera. The hub computing device may then receive motion paths from the camera in real-time and use the model with the machine learning system to generate indications of normal and anomalous motion paths.

Indications of anomalous and normal motion paths may be sent to any suitable computing device, which may use the indications in any suitable manner. For example, if the indications are generated on a camera, the indications may be sent to a hub computing device or cloud computing system, which may use the indications to generate and send notifications to a user or to control devices and systems in the environment.

Data generated from video from all of the cameras in the environment may be used for training a machine learning system to detect normal and anomalous motion paths that cross the fields of view of more than one camera. The motion paths generated from videos from all of the cameras in an environment may be stored along with contextual data about the motion paths as part of a training data set for all of the cameras. The motions paths may be the same motion paths used to train the machine learning system and generate models that are specific to each camera, or may be additional motion paths generated by applying person detection and motion tracking to additional video from the cameras. The training data may be labeled, for example, by a human, or through the use of a heuristic model, statistical model, or other classifier or clustering model, to identify normal and anomalous motion paths to allow use of the data in supervised training of a machine learning system. The training data may also be unlabeled and may be used in unsupervised training of the machine learning system.

A machine learning system may be trained using data generated by the multiple cameras to generate a model for the multiple cameras in the environment that may be used to identify normal and anomalous paths of motion across the fields of view of the multiple cameras. For example, motion paths and contextual data from the multiple cameras in an environment may be input to a machine learning system. The machine learning system may be, for example, a recurrent neural network, including a deep learning neural network. In some implementations, if smaller amounts of data have been generated from the videos from the cameras, the machine learning system may be a support vector machine or a regression model. Supervised learning may be used to train the machine learning system when the training data is labeled, and unsupervised learning may be used when the training data is unlabeled. The training of the machine learning system to generate the model may be offline training, and may occur after any suitable amount of data for the training has been generated from the videos from the cameras. The model generated by training the machine learning system may be a model to be used by that machine learning system. For example, the model may be a set of weights for a deep learning neural network.

The model generated by training the machine learning system for multiple cameras may be used to identify normal and anomalous motions paths across the fields of view of the multiple cameras in real-time. Person detection and motion tracking may be used to generate motion paths for persons detected in the fields of view of the multiple cameras. The motion paths generated from videos from the multiple cameras in the environment and contextual data, which may be of the same type as the contextual data used to train the machine learning system, may be input to the machine learning system. The machine learning system, using the model, may output an indication of whether the motion paths across the fields of view of multiple cameras are normal or anomalous. For example, the model used by the machine learning system may correlate the location at which a normal motion path exits the field of view of first camera with a location that the motion path enters the field of view of a second camera and an amount of time between when the motion path enters the field of the first camera and enters the field of view of the second camera. A motion path detected in real-time that exits the field of view of the first camera at the location of the normal motion path, but does not subsequently enter the field of view of the second camera at the correlated location after the correlated amount of time may be considered by the machine learning system to be anomalous. Similarly, a motion path that enters the field of view of the second camera at a location that is not correlated with the exit location from the field of view of the first camera may be considered by the machine learning system to be anomalous.

The motion paths and contextual data may be input to the machine learning system at any suitable intervals. For example, for all of the cameras, a motion path and contextual data from a camera may be input to the machine learning system after every new frame of video in a person is detected after the initial detection of a person in the field of view of the camera until the person is no longer detected in the field of view of the camera. The motion path and contextual data from a camera may be input to the machine learning system at timed intervals, such as, for example, once every second. The machine learning system may receive data from all of the cameras, including those that do not currently detect a person in their field of view, or may only receive data from those cameras that currently detect a person in their field of view and are currently using motion tracking to generate a motion path for the person. The motion paths input to the machine learning system may include previous motion paths from any suitable length of time, for example, motion paths from the previous five minutes, so that the machine learning system may correlate motion paths that have been completed in one field of view with motion paths being detected in real-time in another field of view.

The machine learning system may output indications of which of the motion paths input along with contextual data, including motion paths input in real-time and previous motion paths, are normal and which are anomalous. The indications may be, for example, a vector that may include a binary indication for each camera that indicates whether the motion path in the field of view of that camera is normal or anomalous, or the vector may include probabilities, such as, for example, a probability that the motion path is normal. Indications of an anomalous motion path may be made for the camera in whose field of view the motion path became anomalous. For example, a normal motion path that exits the field of view of a first camera at an exit location for a normal motion path and enters the field of view of a second camera at a location that is not correlated with the exit location may result in an indication of an anomalous motion path that indicates the second camera.

Indications output by the machine learning system using the model for multiple cameras may be used in any suitable manner. For example, the number of notifications sent to a user based on individual cameras detecting a person may be reduced when the person's motion across the fields of view of multiple cameras is indicated to be a normal motion path. The detected motion paths may be used to determine if a person is approaching or leaving the environment. The detected motion paths may also be used to determine if there are gaps in the coverage of the fields of view of the multiple cameras, for example, based on the amount of time between when a person on a normal motion path exits the field of view a first camera and enters the field of view of a second camera. A larger amount of time may indicate that there is space between the field of view of the first camera and the field of view of the second camera that is not covered by the field of view of any other camera, but is commonly traversed.

In some implementations, the motion paths may be for objects, such as vehicles, or animals, such as pets. Motions paths for objects or animals may be used to generate models in conjunction with, or separately from, motion paths for persons. For example, a single camera may have one camera model generated based on motion paths for both persons and animals and objects moving through the camera's field of view, or two camera models, a first model generated based on motion paths for persons that move through the camera's field of view, and a second model for objects and animals that move through the camera's field of view. Detection and tracking to generate motion paths may be applied to objects and animals in video in the same manner as detection and tracking are applied to video to generate motion paths for persons.

FIG. 1A shows an example system and arrangement suitable for anomalous path detection within cameras' fields of view according to an implementation of the disclosed subject matter. An environment 150 may include a camera 170. The environment 150 may be any suitable environment or structure, such as, for example, a house, office, apartment, or other building, or area with any suitable combination of indoor and outdoor spaces. The camera 170 may be any suitable camera for generating video of the environment 150. The camera 170 may have a field of view 180, which may be the area of the environment 150 viewable in video generated by the camera 170.

A computing device 100 may include a person detector 110, motion tracker 120, machine learning system 130, and storage 140. The computing device 100 may be any suitable computing device or system, such as, for example, a computer 20 as described in FIG. 11, for implementing the person detector 110, the motion tracker 120, the machine learning system 130, and the storage 140. The computing device 100 may be, for example, part of the camera 170, part of a hub computing device that acts as a controller for the environment 150, part of a distributed or ambient computing platform that uses computing devices within the environment 150, part of a cloud computing system including a server system that provides cloud computing services using any suitable computing devices connected in any suitable manner distributed over any area, or any suitable combination thereof. The computing device 100 may, for example, include computing hardware and resources on any of the camera 170, a hub computing device in the environment 150, other computing devices in the environment 150, and a cloud computing system, with any of the person detector 110, the motion tracker 120, the machine learning system 130, and the storage 140 being implemented using any of the computing hardware and resources. The person detector 110 may be any suitable combination of hardware or software for detecting the presence of a person in a video. The motion tracker 120 may be any suitable combination of hardware and software for tracking the motion path of a person across a period of time in a video as the person moves within the field of view of the camera that generated the video. The machine learning system 130 may be any suitable combination of hardware and software for implementing a machine learning system that may be trained using motion paths from the camera 170 generating a camera model 142 that may be used to differentiate normal and anomalous motion paths across the field of view 180 of the camera 170. The storage 140 may be any suitable combination of hardware and software for implementing volatile and non-volatile storage.

The camera 170 may be positioned within the environment 150 in any suitable location. For example, the camera 170 may be positioned near a front door of a house of the environment 150. The field of view 180 may, for example, include an area outside of the front door. The camera 170 may generate video of the area within the field of view 180. The camera 170 may be active and generate video continuously, or may be activated under specific conditions, such as, for example, based on detection of motion by a motion sensor in the vicinity of the camera. Video generated by the camera 170 may be sent to the person detector 110 of the computing device 100. The video may be sent in any suitable manner depending on where the person detector 110 is implemented. For example, if the person detector 110 is implemented using computing hardware that is part of the camera 170, the person detector 110 may have direct access to the video as it is generated or from a storage of the camera

170. If the person detector 110 is implemented using computing hardware separate from the camera 170, the video may be sent using, for example, any suitable wired or wireless local or wide area network connection, including the Internet, and may be sent in any suitable format.

The person detector 110 may be any suitable combination of hardware or software for detecting the presence of a person in a video. The person detector 110 may receive video of the field of view 180 generated by the camera 170. The person detector 110 may determine which portions of the video include a person, for example, by checking for the presence of a person in each frame of the video. The portions of the video that include a person may be sent to the motion tracker 120. The portions of the video may be sent in any suitable manner. For example, if the person detector 110 and motion tracker 120 are implemented on the same computing hardware, for example, on the camera 170, the motion tracker 120 may have direct access to the output of the person detector 110. If the motion tracker 120 is implemented on computing hardware separate from the person detector 110, the portions of the video that include a person may be sent to the motion tracker 120 using, for example, any suitable wired or wireless local or wide area network connection, including the Internet, and may be sent in any suitable format.

The motion tracker 120 may be any suitable combination of hardware and software for tracking the motion path of a person across a period of time in a video as the person moves within the field of view of the camera that generated the video. The motion tracker 120 may receive the portions of the video that the person detector 110 determined included a person. The motion tracker 120 may track the motion of the person detected in the video, generating a motion path for the person in the field of view 180. The motion tracker 120 may track the motion of the person in any suitable manner. For example, the motion tracker 120 may determine the location of the person in each frame of the portion of the video with the person using any suitable coordinate system and may store the locations sequentially as the motion path of the person, may store an image of the motion path across the field of view 180, or may store the motion path in any other suitable format. The motion path may start at the location of the person in the first frame of video in which the person was detected, which may be the entry location of the motion path for the field of view 180. The motion path may end at the location of the last frame of video in which the person was detected, which may be exit location of the motion path for the field of view 180. A single motion path may be continuous within the field of view 180. If a person entered the field of view 180, left the field of view 180, re-entered the field of view 180, and the re-exited the field of view 180, this may result in the person detector 110 sending two separate portions of video to the motion tracker 120, which may generate two separate motion paths.

The motion paths generated by the motion tracker 120 may be stored in the storage 140. The storage 140 may store a camera training data set 143, which may be training data for the machine learning system 130. The camera training data set 143 may store separate motion path data for each motion path generated by the motion tracker 120 from video from the camera 170. For example, motion path data 144 may include motion path 145 and contextual data 146, and motion path data 147 may include motion path 148 and contextual data 149. The motion path 145 and the motion path 146 may be separate motion paths generated from video from the camera 170 based on separate portions of the video in which a person was detected. The contextual data 146 may be contextual data for the motion path 145, such as, for example, time and date for the motion path. Contextual data 149 may be contextual data for the motion path 148. Contextual data may be received from any suitable source and stored with the motion path data 147. For example, the contextual data 149 may be received from the camera 170, may be generated by the computing device 100, or may be received from an external computing device that may provide a data service, such as, for example, a time and date service or a facial recognition service. The motion path data stored in the camera data training set 143 may include only motion paths generated from video from the camera 170 while the camera 170 has the field of view 180. If the camera 170 is moved so that its field of view is no longer the field of view 180, motion path data from the camera training data set 143 stored before the field of view of the camera 170 changed may no longer be used to train the machine learning system 130.

The machine learning system 130 may be any suitable combination of hardware and software for implementing any suitable machine learning system that may be trained to determine normal and anomalous motion paths. The machine learning system 130 may be, for example, an artificial neural network such as a deep learning neural network, a Bayesian network, support vector machine, regression model, classifier of any type, or any other suitable statistical or heuristic machine learning system type. The machine learning system 130 may be trained using a camera training data 143 set to generate a camera model, such as the camera model 142. The machine learning system 130 may then use the camera model to detect normal and anomalous motion paths in real-time video from the camera whose video was used to generate the camera training data set 143, for example the camera 170.

For example, the camera training data set 143 may be input to the machine learning system 130 in order to train the machine learning system 130. The camera training data set 143 may be input to the machine learning system 130 in any suitable manner. The camera training data set 143 may include labels indicating whether the motion paths, such as the motion paths 145 and 148, in the motion path data, such as the motion path data 144 and 147, are normal or anomalous motion paths. The labels may be generated in any suitable manner, including, for example, through human labeling or through cluster analysis of the motion paths in the camera training data set 143. The camera training data set 143 may also be unlabeled. The machine learning system 130 may be trained in any suitable manner, such as, for example, through offline supervised training when the camera training data set 143 is labeled, and offline unsupervised training when the camera training data set 143 is unlabeled. The training of the machine learning system 130 may generate the camera model 142. The camera model 142 may be a model in any suitable format used by the machine learning system 130, such as, for example, the weights and architecture of a neural network, and may be stored in the storage 140. The camera model 142 may be specific to the camera 170 and the field of view 180, and may be used by the machine learning system 130 to determine whether motion paths detected in video of the field of view 180 generated by the camera 170 are normal or anomalous in real-time. Different cameras in the environment 150 may have different camera models generated for them through training of the machine learning system 130.

Figure 1B:
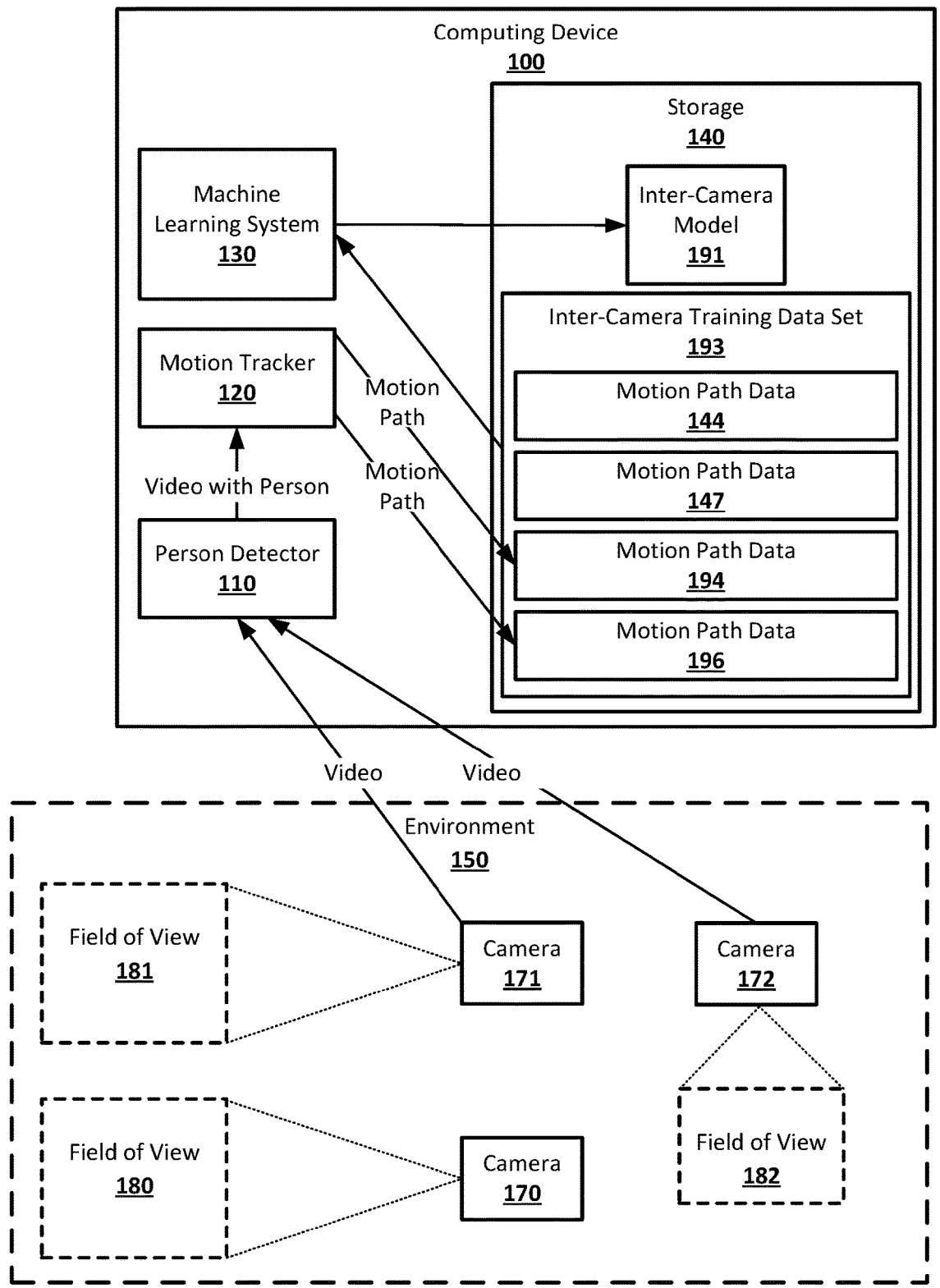
FIG. 1B shows an example system and arrangement suitable for anomalous path detection within cameras' fields of view according to an implementation of the disclosed subject matter.

FIG. 1B shows an example system and arrangement suitable for anomalous path detection within cameras' fields of view according to an implementation of the disclosed subject matter. The environment 150 may include multiple cameras, including the camera 170, a camera 171, and a camera 172. The cameras 171 and 172 may be any suitable cameras for generating video of the environment 150. The camera 171 may have a field of view 181, and the camera 172 may have a field of view 182.

The cameras 171 and 172 may generate video of the areas of the environment 150 within their respective fields of view 181 and 182. Videos generated by the cameras 171 and 172 may be sent to the person detector 110 of the computing device 100, which may output portions of the videos in which persons are detected to the motion tracker 120. The motion tracker 120 may generate motion paths from the portions of the videos received from the person detector 110. The motion paths generated by the motion tracker 120 may be stored along with contextual data as motion path data 194 and 195. The motion path data 194 may include a motion path from the field of view 181 of the camera 171, and may be part of a camera training data set used to generate a camera model for the camera 171, or may be separate from the motion path data used to generate a camera model for the camera 171. The motion path data 195 may include a motion path from the field of view 182 of the camera 172, and may be part of a camera training data set used to generate a camera model for the camera 172, or may be separate from the motion path data used to generate a camera model for the camera 172. The motion path data 194 and motion path data 195 may also be stored along with the motion path data 144 and motion path data 147 in an inter-camera training data set 193.

The inter-camera training data set 193 may be stored in the storage 140. The inter-camera training data 193 set may include motion path data from multiple cameras in the environment 150, for example, the cameras 170, 171, and 172, and may be training data for the machine learning system 130. The inter-camera training data set 193 may include the same motion path data as the camera training data sets for the cameras 170, 171, and 172, such as the camera training data set 143, or may include separate motion path data, for example, motion path data generated from different video from the cameras 170, 171, and 172 than the video used to generate the camera training data sets.

The machine learning system 130 may be trained using the inter-camera training data set 193 to generate an inter-camera model 191. The machine learning system 130 may then use the inter-camera model 191 to detect normal and anomalous motion paths that cross multiple fields of view in real-time video from the cameras 171, 172, and 173 whose video was used to generate the inter-camera training data set 193.

For example, the inter-camera training data set 193 may be input to the machine learning system 130 in order to train the machine learning system 130. The inter-camera training data set 193 may be input to the machine learning system 130 in any suitable manner. The inter-camera training data set 193 may include labels that correlate motion paths across different motion path data and indicate whether the correlated motion paths are normal or anomalous motion paths. The labels may be generated in any suitable manner, including, for example, through human labeling or through cluster analysis of the motion paths in the inter-camera training data set 193. The inter-camera training data set 193 may also be unlabeled. The machine learning system 130 may be trained in any suitable manner, such as, for example, through offline supervised training when the inter-camera training data set 193 is labeled, and offline unsupervised training when the inter-camera training data set 193 is unlabeled. The training of the machine learning system 130 may generate the inter-camera model 191. The inter-camera model 191 may be a model in any suitable format used by the machine learning system 130, such as, for example, the weights and architecture of a neural network, and may be stored in the storage 140. The inter-camera model 191 may be specific to the cameras whose video was used to generate the inter-camera training data set 193 and their respective fields of view, for example the cameras 170, 171, and 172 and the field of view 180, 181, and 182, and may be used by the machine learning system 130 to determine whether motion paths that cross multiple fields of view are normal or anomalous in real-time.

Figure 2A:
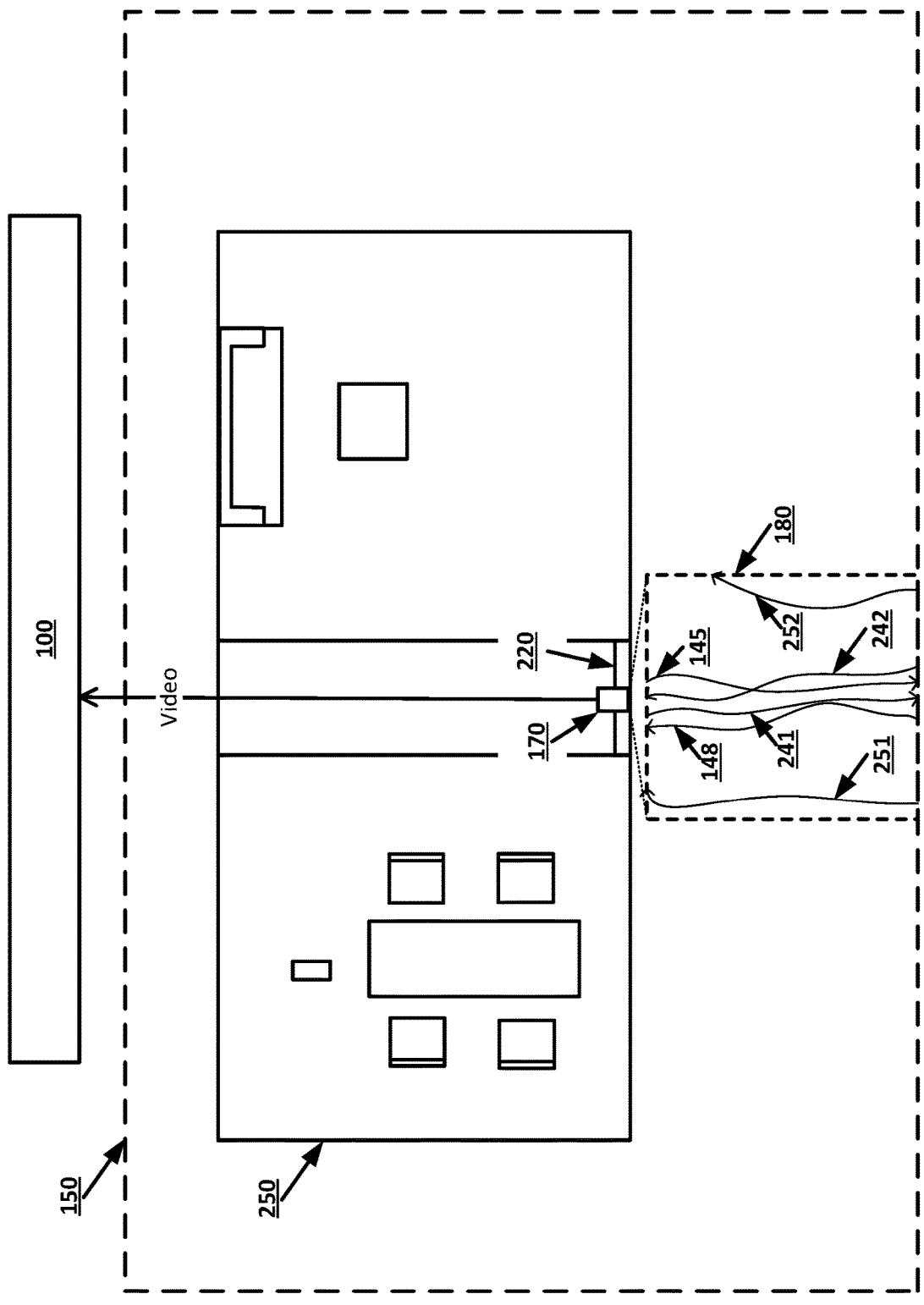
FIG. 2A shows an example environment suitable for anomalous path detection within cameras' fields of view according to an implementation of the disclosed subject matter.

FIG. 2A shows example motion paths in a field of view of a camera suitable for anomalous path detection within cameras' fields of view according to an implementation of the disclosed subject matter. An environment 150 may include a structure 250 with an entryway 220, which may be, for example, an external door used to enter and exit the structure 250. The camera 170 may be positioned so that the field of view 180 encompasses an area of the environment 150 outside of the entryway 220. As persons enter and exit the field of view 180, video from the camera 170 may be processed by the person detector 110 and the motion tracker 120. The motion tracker 120 may generate motion paths including the motion paths 145, 148, 241, 242, 251, and 252, each of which may be the motion of a person through the field of view 180.

The motion paths 145, 148, 241, 242, 251, and 252, may be stored along with their respective contextual data as motion path data in the camera training data set 143. The camera training data set 143 may be used to train the machine learning system 130 and generate the camera model 142 for the camera 170 with the field of view 180. The camera model 142, when used with the machine learning system 130, may indicate that the motion paths which traverse the center of the field of view 180, for example, the motion paths 145, 148, 241, and 242, are normal motion paths, while motion paths that traverse the edges of the field of view 180, for example, the motion paths 251 and 252, are anomalous motion paths. This may be based on, for example, clustering the motion paths and determining that the larger cluster includes the motion paths which traverse the middle of the field of view 180.

Figure 2B:
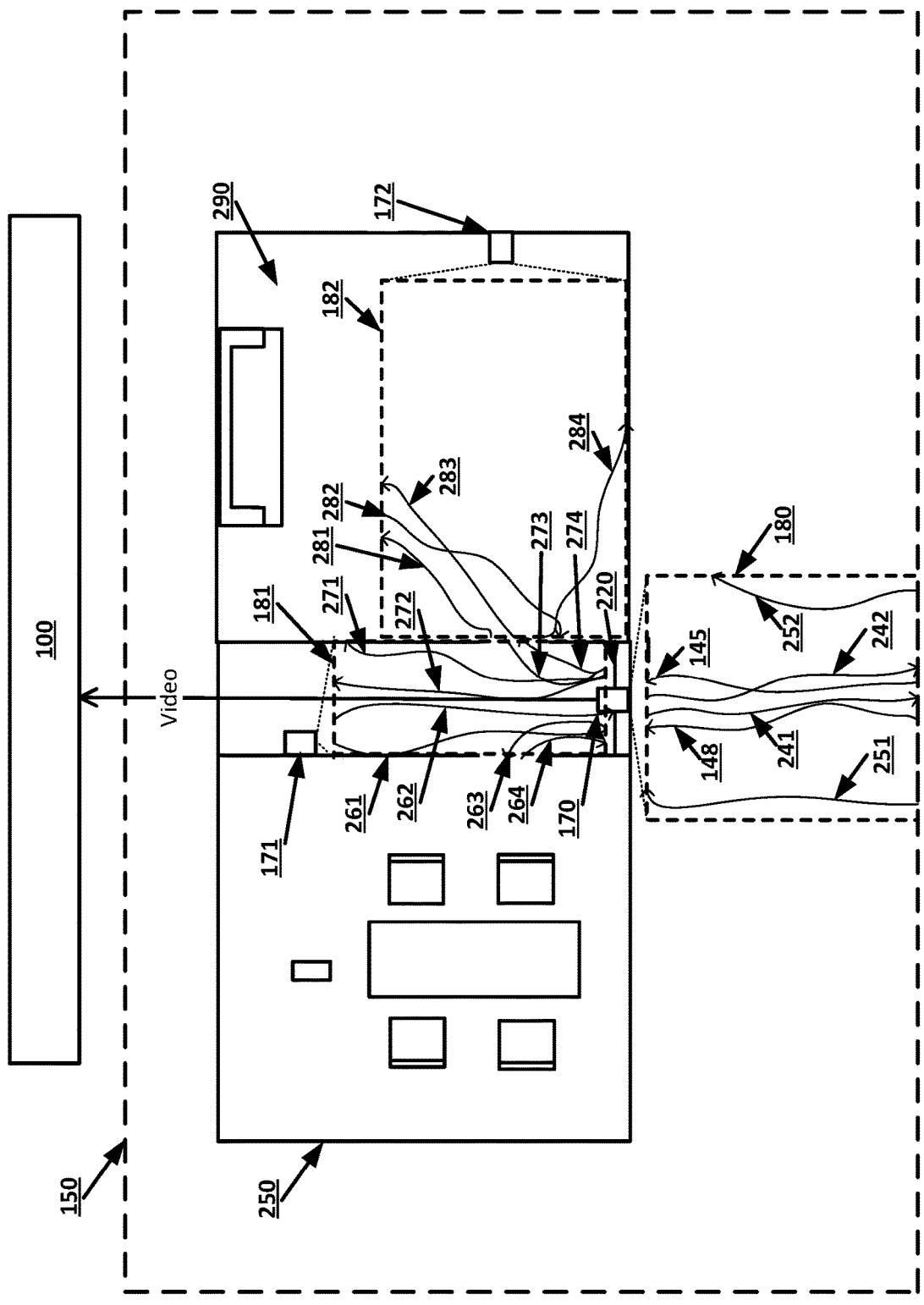
FIG. 2B shows an example environment suitable for anomalous path detection within cameras' fields of view according to an implementation of the disclosed subject matter.

FIG. 2B shows example motion paths in a field of view of a camera suitable for anomalous path detection within cameras' fields of view according to an implementation of the disclosed subject matter. The environment 150 may also include the cameras 171 and 172 in addition to the camera 170. The camera 171 may, for example, be positioned on the interior of the structure 250 so that the field of view 181 encompasses an area of the environment 150 that includes the interior of the structure 250 behind the entryway 220. The camera 172 may be positioned in a room 290 so that the field of view 182 encompasses an area of the environment 150 that includes the interior of the room 290 in the structure 250 including an entrance to the room 290.

The motion paths 261, 262, 263, 264, 271, 272, 273, and 274 generated from video from the camera 171 and the motion paths 28, 282, 283, and 284 generated from video from the camera 181 may be stored along with their respective contextual data as motion path data in the inter-camera training data set 193. The motion paths 145, 148, 241, 242, 251, and 252, may also be stored along with their respective contextual data as motion path data in the inter-camera training data set 193. The inter-camera training data set 143 may be used to train the machine learning system 130 which may generate the inter-camera model 191 for the cameras 170, 171, and 172 and their respective fields of view 180, 181, and 182. The inter-camera model 191, when used with the machine learning system 130, may indicate that motion paths which cross fields of view in a continuous manner with exit locations from one field of view correlating with entry locations to another field of view and timing gaps between entry and exit that correspond to a learned gap between the fields of view are normal motion paths. The inter-camera model 191, when used with the machine learning system 130, may indicate that motion paths which cross fields of view in a discontinuous manner, for example, with longer than expected timing gaps or uncorrelated entry and exit locations, are anomalous motion paths. For example, the motion path 145, the motion path 273, and the motion path 281 may form a normal motion path across the fields of view 180, 181, and 182, as they are continuous, and may have small timing gaps between them, while the motion path 264 and the motion path 242 may form an anomalous motion path, as the exit location of the motion path 264 from the field of view 181 may be uncorrelated to the entry location of the motion path 242 into the field of view 180, and the timing gap may be longer than expected.

Figure 3A:
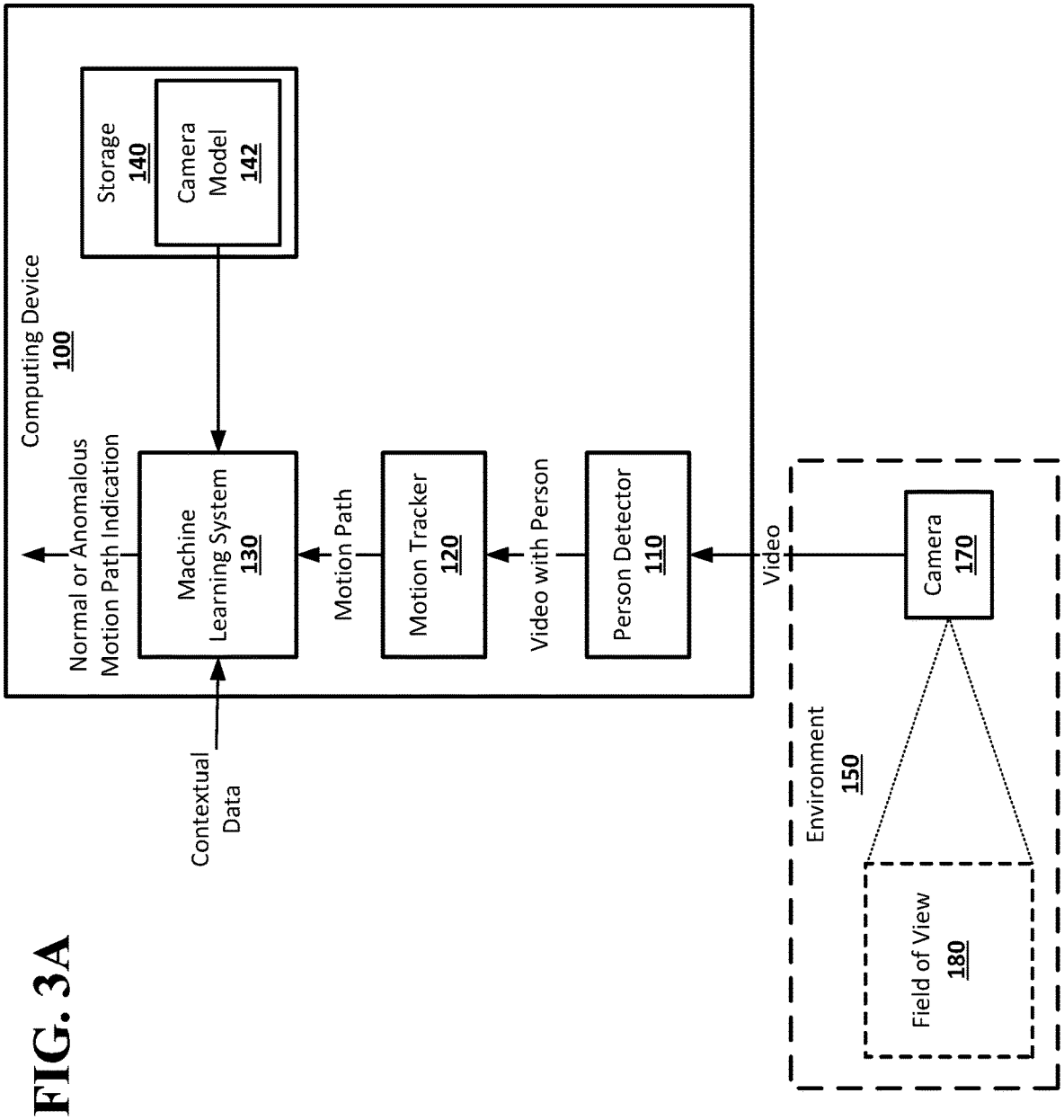
FIG. 3A shows an example system and arrangement suitable for anomalous path detection within cameras' fields of view according to an implementation of the disclosed subject matter.

FIG. 3A shows an example system and arrangement suitable for anomalous path detection within cameras' fields of view according to an implementation of the disclosed subject matter. After the camera model 142 is generated and stored in the storage 140, the camera 170 may generate video of the area within the field of view 180. The video generated by the camera 170 may be sent to the person detector 110 of the computing device 100 in real-time. For example, as each frame of the video is generated, that frame may be sent to the person detector 110.

The person detector 110 may receive the video of the field of view 180 generated by the camera 170 and sent to the person detector 110 in real-time. The person detector 110 may determine which portions of the video include a person, and the portions of the video that include a person may be sent to the motion tracker 120. The portions of the video in which a person is detected may be sent to the motion tracker 120 in real-time. For example, the person detector 110 may send each frame of the video in which a person is detected to the motion tracker 120 at the time the person is detected in the frame.

The motion tracker 120 may receive the portions of the video that the person detector 110 determines include a person and may track the motion of the person detected in the video, generating a motion path for the person in the field of view 180 in real-time. The motion tracker 120 may determine the location of the person in each frame of video received from the person detector 110 using any suitable coordinate system and may store the locations sequentially as the motion path of the person. The motion path may start at the location of the person in the first frame of video in which the person was detected, which may be the entry location of the motion path for the field of view 180. The motion path may end at the location of the last frame of video in which the person was detected, which may be exit location of the motion path for the field of view 180.

The motion path generated by the motion tracker 120 may be sent to the machine learning system 130. The motion path may be sent to the machine learning system 130 in real-time, at specified intervals, or only when the motion path has ended. For example, if the motion path is sent in real-time, the motion path may be sent to the machine learning system 130 based on one frame of video after the person is initially detected by the person detector 110, based on two frames of video after the person is detected in the next frame of video, and so on until the motion path ends when the person exits the field of view 180. A motion path for a person who is detected in 360 consecutive frames of video from the camera 170 may be sent to the machine learning system 130 a total of 360 times, with the motion path being extended by the motion in one additional frame of video each time, represented, for example, as an additional set of coordinates. If the motion path is sent at intervals, the motion tracker 120 may wait until the motion path has been generated using a suitable number of frames or length of video before sending the motion path to the machine learning system 130. For example, the motion path for the person detected in 360 consecutive frames of video may be sent to the machine learning system 130 six times, once every 60 frames of video, with the motion path being extended by 60 additional frames of video each time. If the motion path is sent only when the motion path has ended, the motion tracker 120 may only send a motion path to the machine learning system 130 when the person has exited the field of view 180 at an exit location. For example, the motion path for the person detected in 360 consecutive frames of video may be sent to the machine learning system 130 once, after the person is not detected in the $361^{st}$ frame of video, indicating that they have exited the field of view 180.

The motion path from the motion tracker 120 and contextual data for the motion path may be input to the machine learning system 130. The machine learning system 130 may use the camera model 142, which may be the camera model for the camera 170 with the field of view 180, to generate an indication of whether the motion path is normal or anomalous based on the motion path and contextual data. For example, the machine learning system 130 may be a deep learning neural network, and the camera model 142 may include weights and architecture for a deep learning neural network based on the training of the machine learning system 130 using the camera training data set 143. The indication output by the machine learning system 130 may be a binary indication, for example, that the motion path is either normal or anomalous, or may be a probability, for example, a probability that the motion path is normal. If the motion path is input to the machine learning system 130 after each frame of video, or at specified intervals, the machine learning system 130 may output an indication for time the motion path is input. Each time the motion path is input, contextual data, which may be received from any suitable source, may also be input, and may be different each time the motion path is input, for example, as the time changes, or if the person is able to be identified.

The indication output by the machine learning system 130 may be used in any suitable manner. For example, the indication may be used to send notifications to a user, who may be an occupant of or person responsible for the environment 150, or to generate control signals to control devices and systems in the environment 150, such as, for example, sensors, locks, and security systems states. For example, an indication of an anomalous motion path in the field of view 180 of the camera 170 may result in controllable locks for the structure 250 being locked and a security system of the structure 250 being set to an armed state. The indication may be sent, for example, to a hub computing device for the environment 150, to a cloud computing system to which devices and systems in the environment 150 are connected, to devices and systems in the environment 150, or to any other suitable computing device which may belong to a user or may control devices and systems in the environment 150.

Figure 3B:
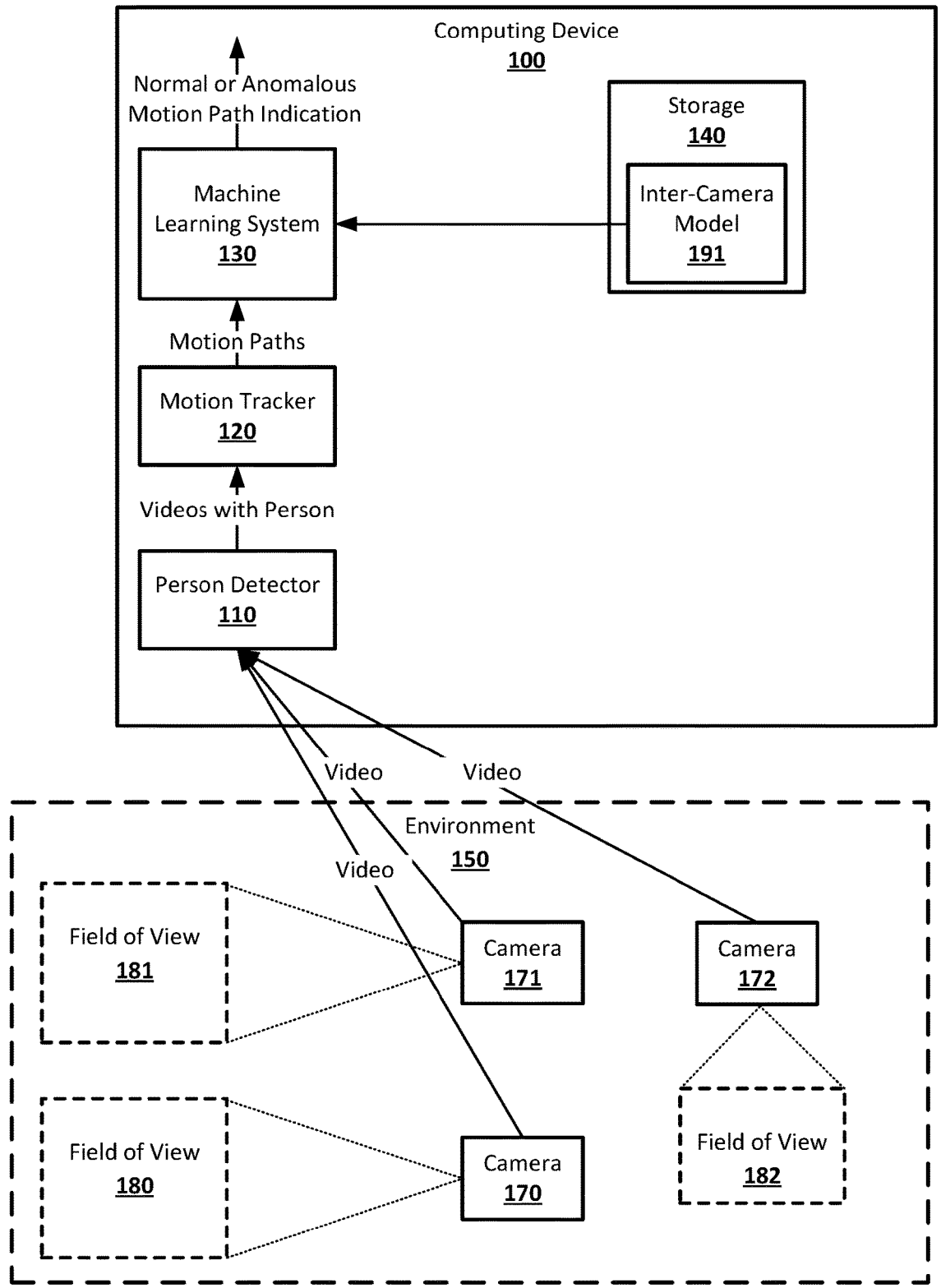
FIG. 3B shows an example system and arrangement suitable for anomalous path detection within cameras' fields of view according to an implementation of the disclosed subject matter.

FIG. 3B shows an example system and arrangement suitable for anomalous path detection within cameras' fields of view according to an implementation of the disclosed subject matter. After the inter-camera model 143 is generated and stored in the storage 140, the cameras 170, 171, and 172 may generate video of the area within their respective fields of view 180, 181 and 182. The videos generated by the cameras 170, 171, and 172 may be sent to the person detector 110 of the computing device 100 in real-time. For example, as each frame of each video is generated, that frame may be sent to the person detector 110. There may be separate implementations of the person detector 110 for each camera, or cameras may share implementations of the person detector 110.

The person detector 110 may receive the videos of the fields of view 180, 181, and 182 generated by the cameras 170, 171, and 172 and sent to the person detector 110 in real-time. The person detector 110 may determine which portions of the videos include a person, and the portions of the videos that include a person may be sent to the motion tracker 120. The portions of the videos in which a person is detected may be sent to the motion tracker 120 in real-time. For example, the person detector 110 may send each frame of the videos in which a person is detected to the motion tracker 120 at the time the person is detected in the frame. There may be separate implementations of the motion tracker 120 for each camera, or cameras may share implementations of the motion tracker 120.

The motion tracker 120 may receive the portions of the videos that the person detector 110 determined included a person and may track the motion of persons detected in the videos, generating motion paths for persons in the fields of view 180, 181, and 182 in real-time. The motion tracker 120 may determine the location of any person in each frame of video received from the person detector 110 and may store the motion path of the person, for example, using a coordinate system, as an image, as vector graphics, or in any other suitable manner.

The motion paths generated by the motion tracker 120 may be sent to the machine learning system 130. A motion path generated by the motion tracker 120 for persons moving in the fields of view 180, 181, and 182 may be sent to the machine learning system 130 in real-time, at specified intervals, or only when the motion path has ended.

The motion paths from the motion tracker 120 and contextual data for the motion paths may be input to the machine learning system 130. The motion paths input to the machine learning system 130 may include both may the most recent motion paths generated by the motion tracker 120 and past motion paths generated by the motion tracker 120 for persons moving in the fields of view 180, 181, and 182. For example, in addition to the most recent motion paths, the input to the machine learning system 130 may include motion paths, and associated contextual data, for all motion paths generated in the fields of view 181, 182, and 183 over the previous five minutes. This may allow for correlation between motion paths across multiple fields of view based on, for example, entry and exit locations of the motion paths and the time elapsed between a motion path exiting one field of vision and entering another field of vision. The machine learning system 130 may use the inter-camera model 191, which may be the camera model for the cameras 170, 171, and 172 with the fields of view 180, 181, and 182, to generate an indication of whether each of the input motion paths are normal or anomalous based on the motion paths and contextual data. For example, the machine learning system 130 may be a deep learning neural network, and the inter-camera model 191 may include weights and architecture for a deep learning neural network based on the training of the machine learning system 130 using the inter-camera training data set 193. The indications output by the machine learning system 130 may be binary indications, for example, that a motion path is either normal or anomalous, or may be a probabilities, for example, a probability that a motion path is normal. The machine learning system 130 may output an indication for every motion path included in the input to the machine learning system 130.

The indications output by the machine learning system 130 may be used in any suitable manner, including sending notifications to a user, reducing the number of notifications sent to a user based on the same person being responsible for a normal motion path across the fields of view of multiple cameras, determine gaps in the coverages of the cameras 170, 171, and 172, determining whether a person is approaching or leaving the structure 250, and generating control signals to control devices and systems in the environment 150, such as, for example, sensors, locks, and security systems states. The indications may be sent, for example, to a hub computing device for the environment 150, to a cloud computing system to which devices and systems in the environment 150 are connected, to devices and systems in the environment 150, or to any other suitable computing device which may belong to a user or may control devices and systems in the environment 150.

Figure 4A:
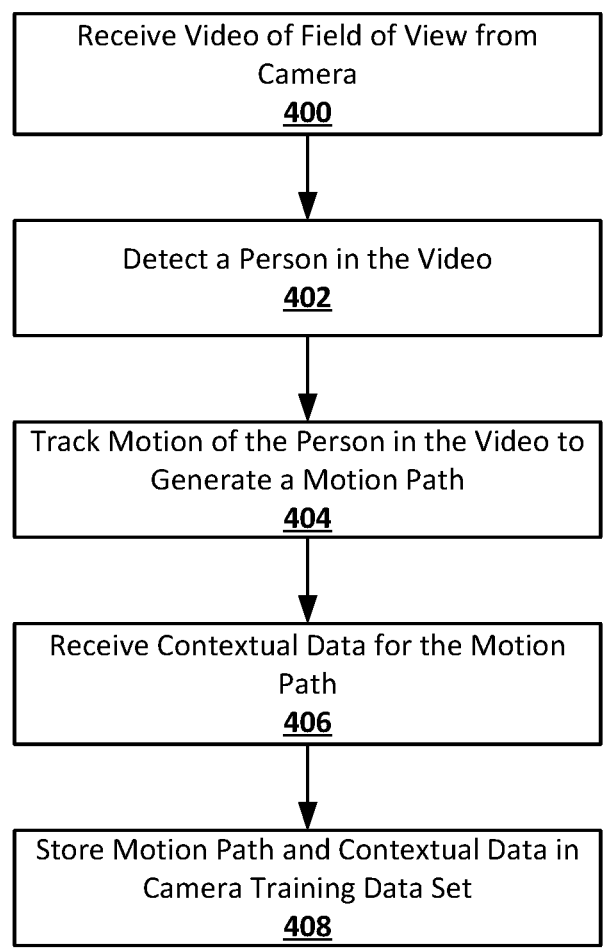
FIG. 4A shows an example process suitable for anomalous path detection within cameras' fields of view according to an implementation of the disclosed subject matter.

FIG. 4A shows an example of a process suitable for anomalous path detection within cameras' fields of view according to an implementation of the disclosed subject matter. At 400, video of the field of view of a camera may be received.

At 402, a person may be detected in the video.

At 404, the motion of the person in the video may be tracked to a generate a motion path.

At 406, contextual data for the motion path may be received.

At 408, the motion path and contextual data may be stored in a camera training data set for the camera and field of view.

Figure 4B:
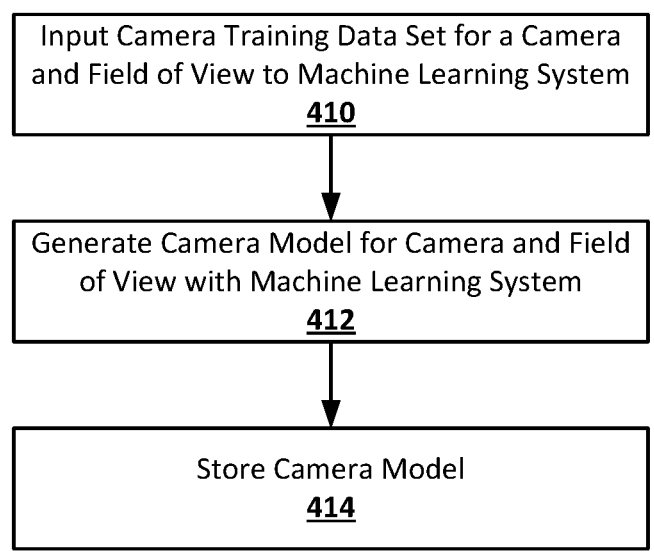
FIG. 4B shows an example process suitable for anomalous path detection within cameras' fields of view according to an implementation of the disclosed subject matter.

FIG. 4B shows an example of a process suitable for anomalous path detection within cameras' fields of view according to an implementation of the disclosed subject matter. At 410, a camera training data set for a camera and field of view may be input to a machine learning system.

At 412, a camera model for the camera and field of view may be generated by the machine learning system.

At 414, the camera model generated by the machine learning system may be stored.

Figure 5A:
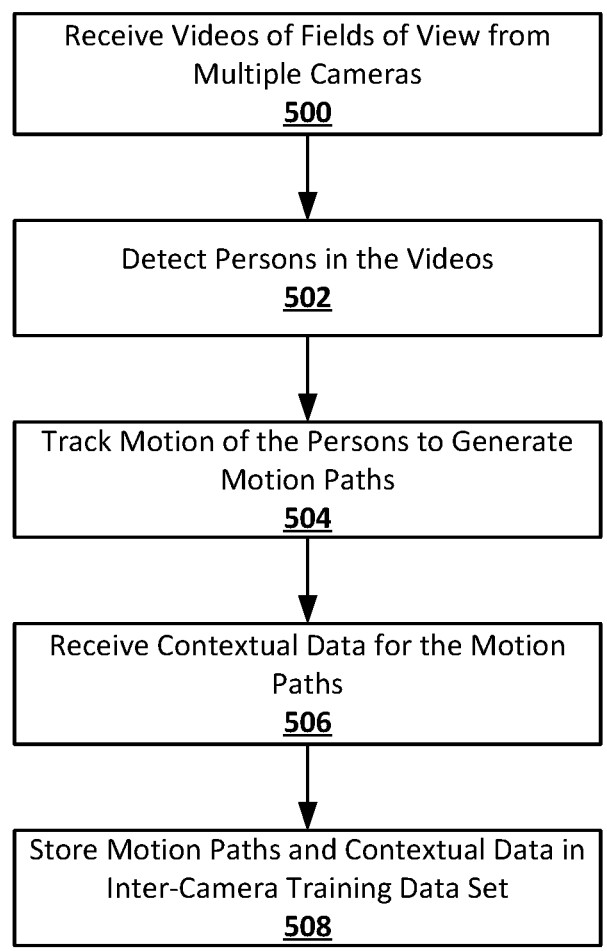
FIG. 5A shows an example process suitable for anomalous path detection within cameras' fields of view according to an implementation of the disclosed subject matter.

FIG. 5A shows an example of a process suitable for anomalous path detection within cameras' fields of view according to an implementation of the disclosed subject matter. At 500, videos of the fields of view of multiple cameras may be received.

At 502, persons may be detected in the videos.

At 504, the motion of the persons in the videos may be tracked to generate motion paths.

At 506, contextual data for the motion paths may be received.

At 508, the motion paths and contextual data may be stored in an inter-camera training data set for the cameras and fields of view.

Figure 5B:
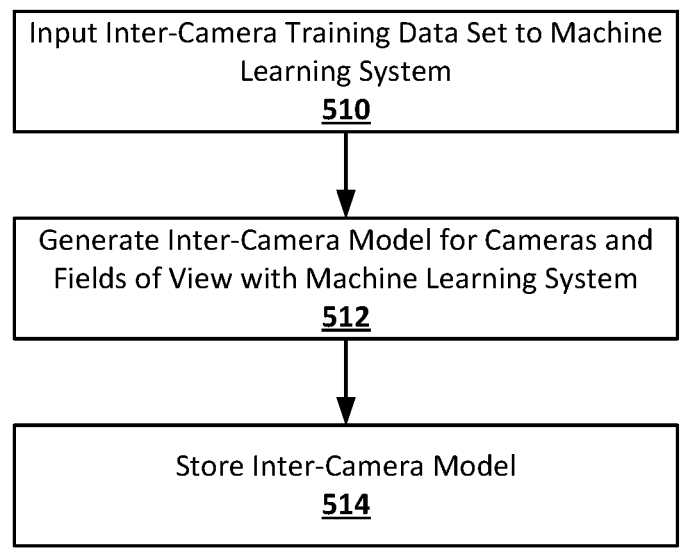
FIG. 5B shows an example process suitable for anomalous path detection within cameras' fields of view according to an implementation of the disclosed subject matter.

FIG. 5B shows an example of a process suitable for anomalous path detection within cameras' fields of view according to an implementation of the disclosed subject matter. At 510, an inter-camera training data set for cameras and their fields of view may be input to a machine learning system.

At 512, an inter-camera model for the cameras and fields of view may be generated by the machine learning system.

At 514, the inter-camera model generated by the machine learning system may be stored.

Figure 6:
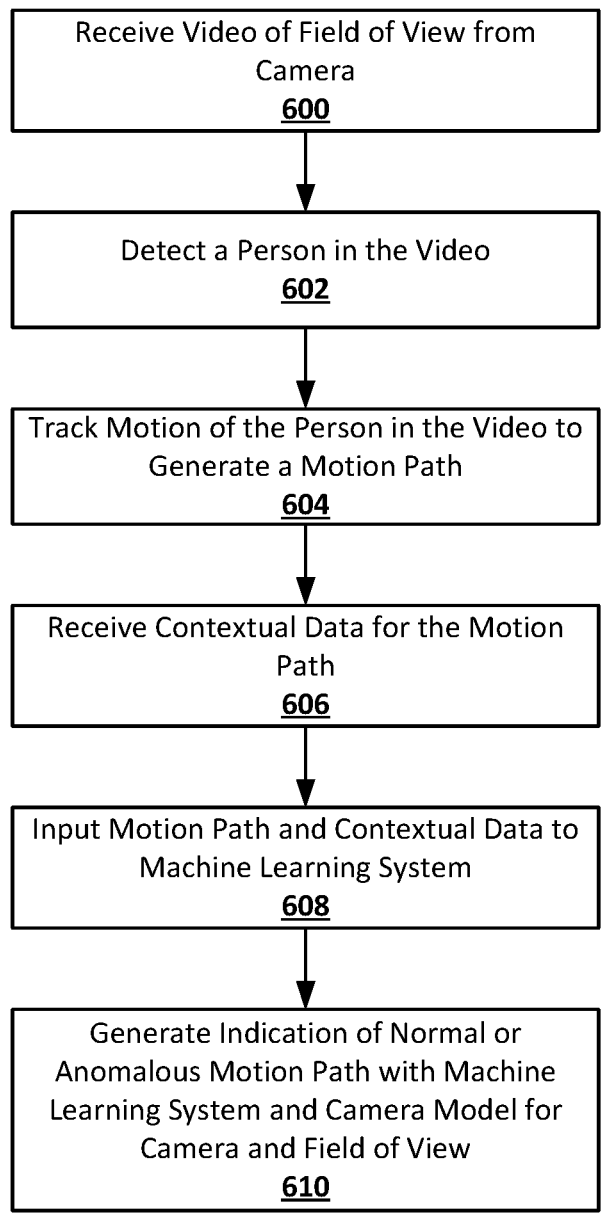
FIG. 6 shows an example process suitable for anomalous path detection within cameras' fields of view according to an implementation of the disclosed subject matter.

FIG. 6 shows an example of a process suitable for anomalous path detection within cameras' fields of view according to an implementation of the disclosed subject matter. At 600, video of the field of view of a camera may be received.

At 602, a person may be detected in the video.

At 604, the motion of the person in the video may be tracked to generate a motion path.

At 606, contextual data for the motion path may be received.

At 608, the motion path and contextual data may be input to a machine learning system.

At 610, an indication of whether the motion path is normal or anomalous may be generated using the machine learning system and a camera model for the camera and field of view.

Figure 7:
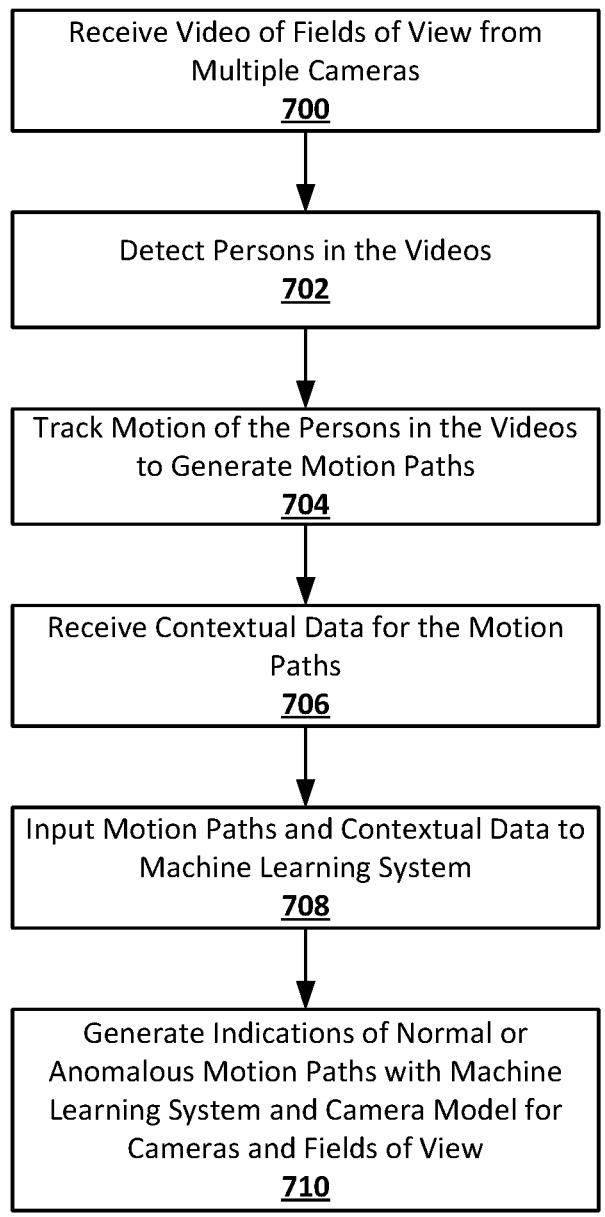
FIG. 7 shows an example process suitable for anomalous path detection within cameras' fields of view according to an implementation of the disclosed subject matter.

FIG. 7 shows an example of a process suitable for anomalous path detection within cameras' fields of view according to an implementation of the disclosed subject matter. At 700, videos of the fields of view of multiple cameras may be received.

At 702, persons may be detected in the videos.

At 704, the motion of the persons in the videos may be tracked to generate motion paths.

At 706, contextual data for the motion paths may be received.

At 708, the motion paths and contextual data may be input to a machine learning system.

At 710, indications of whether the motion paths are normal or anomalous may be generated using the machine learning system and an inter-camera model for the cameras and fields of view.

Video of a field of view of a camera in an environment may be received from the camera. A person may be detected in the video. Motion of the person in the video may be tracked to generate a motion path. Contextual data for the motion path may be received. The motion path and contextual data may be stored in a camera training data set. A camera model for the camera and the field of view may be generated by inputting the camera training data set to a machine learning system. The camera model for the camera and the field of view may be stored.

Additional video of the field of view of the camera may be received. A person may be detected in the additional video. Motion of the person in the additional video may be tracked to generate a second motion path. Second contextual data for the second motion path may be received. An indication of normal or anomalous motion path for the second motion path may be generated by inputting the second motion path and the second contextual data to the machine learning system wherein the machine learning system uses the camera model for the camera and the field of view.

In response to the indication of normal or anomalous motion path indicating that the motion path is anomalous, a notification that the motion path is anomalous may be sent to a user associated with the environment, a notification that the motion path is anomalous may be sent to a cloud computing system or hub computing device of the environment, or control signals may be generated and sent to devices or systems in the environment.

In response to the indication of normal or anomalous motion path indicating that the motion path is anomalous and at least one previously generated indication of normal or anomalous motion path indicating that at least one previous motion path is anomalous, a notification may be sent to a user associated with the environment that the field of view of the camera has changed.

Videos of fields of view of the multiple cameras may be received from multiple cameras in the environment. The camera may be one of the multiple cameras. Persons may be detected in the additional videos. Motion of the persons in the videos may be tracked to generate additional motion paths. Additional contextual data for the additional motion paths may be received. The motion path, additional motion paths, contextual data, and additional contextual data may be stored in an inter-camera training data set. An inter-camera model for the multiple cameras and fields of view may be generated by inputting the inter-camera training data set to the machine learning system. The inter-camera model for the multiple cameras and the fields of view may be stored.

Additional videos may be received from two or more of the multiple cameras. Persons may be detected in the additional videos. Motion of the persons in the additional videos may be tracked to generate additional motion paths. Additional contextual data for the additional motion paths may be received. Indications of normal or anomalous motion paths for the additional motion paths may be generated by inputting the additional motion paths and the additional contextual data to the machine learning system wherein the machine learning system uses the inter-camera model for the multiple cameras and the fields of view.

Video of a field of view of a second camera in the environment may be received from the second camera. detecting a person in the video of the field of view of the second camera. Motion of the person in the video of the field of view of the second camera may be tracked to generate a second motion path. Second contextual data for the second motion path may be received. The second motion path and second contextual data may be stored in a second camera training data set. A second camera model for the second camera and the field of view of the second camera may be generated by inputting the second camera training data set to the machine learning system. The second camera model for the second camera and the field of view of view of the second camera may be stored.

Generating the motion path may include generating a sequence of coordinates for locations of the person in sequential frames of the video or generating an image of a path of the person through the field of view of the camera.

The contextual data for the motion path may include time of day, date, identification of the person, the length of the motion path in the field of view, and the time span the motion path is in the field of view.

A computing device may receive, from a camera in an environment, video of a field of view of the camera, detect a person in the video, track motion of the person in the video to generate a motion path, receive contextual data for the motion path, store the motion path and contextual data in a camera training data set, generate a camera model for the camera and the field of view by inputting the camera trains data set to a machine learning system, and store the camera model for the camera and the field of view.

The computing device may further receive, from the camera, additional video of the field of view of the camera, detect a person in the additional video, track motion of the person in the additional video to generate a second motion path, receive second contextual data for the second motion path, and generate an indication of normal or anomalous motion path for the second motion path by inputting the second motion path and the second contextual data to the machine learning system wherein the machine learning system uses the camera model for the camera and the field of view.

The computing device, in response to the indication of normal or anomalous motion path indicating that the motion path is anomalous, may send a notification that the motion path is anomalous to a user associated with the environment, may send a notification that the motion path is anomalous to a cloud computing system or hub computing device of the environment, or may generate and send control signals to one or more devices or systems in the environment.

The computing device, in response to the indication of normal or anomalous motion path indicating that the motion path is anomalous and at least one previously generated indication of normal or anomalous motion path indicating that at least one previous motion path is anomalous, may send a notification to a user associated with the environment that the field of view of the camera has changed.

The computing devices may further receive, from multiple cameras in the environment, videos of fields of view of the multiple cameras, wherein the camera is one of the multiple cameras, detect persons in the additional videos, track motion of the persons in the videos to generate additional motion paths, receive additional contextual data for the additional motion paths, store the motion path, additional motion paths, contextual data, and additional contextual data in an inter-camera training data set, generate an inter-camera model for the multiple cameras and fields of view by inputting the inter-camera training data set to the machine learning system, and store the inter-camera model for the multiple cameras and the fields of view.

The computing device may further receive additional videos from two or more of the multiple cameras, detect persons in the additional videos, track motion of the persons in the additional videos to generate additional motion paths, receive additional contextual data for the additional motion paths, and generate indications of normal or anomalous motion paths for the additional motion paths by inputting the additional motion paths and the additional contextual data to the machine learning system wherein the machine learning system uses the inter-camera model for the multiple cameras and the fields of view.

The computing device may further receive, from a second camera in the environment, video of a field of view of the second camera, detect a person in the video of the field of view of the second camera, track motion of the person in the video of the field of view of the second camera to generate a second motion path, receive second contextual data for the second motion path, store the second motion path and second contextual data in a second camera training data set, generate a second camera model for the second camera and the field of view of the second camera by inputting the second camera training data set to the machine learning system, and store the second camera model for the second camera and the field of view of view of the second camera.

The computing device may generate the motion path by generating a sequence of coordinates for locations of the person in sequential frames of the video or generating an image of a path of the person through the field of view of the camera.

According to an embodiment of the disclosed subject matter, a means for receiving, receiving, from a camera in an environment, video of a field of view of the camera, a means for detecting a person in the video, a means for tracking motion of the person in the video to generate a motion path, a means for receiving contextual data for the motion path, a means for storing the motion path and contextual data in a camera training data set, a means for generating a camera model for the camera and the field of view by inputting the camera training data set to a machine learning system, a means for storing the camera model for the camera and the field of view, a means for receiving, from the camera, additional video of the field of view of the camera, a means for detecting a person in the additional video, a means for tracking motion of the person in the additional video to generate a second motion path, a means for receiving second contextual data for the second motion path, a means for generating an indication of normal or anomalous motion path for the second motion path by inputting the second motion path and the second contextual data to the machine learning system wherein the machine learning system uses the camera model for the camera and the field of view, a means for, in response to the indication of normal or anomalous motion path indicating that the motion path is anomalous, one or more of sending a notification that the motion path is anomalous to a user associated with the environment, sending a notification that the motion path is anomalous to a cloud computing system or hub computing device of the environment, and generating and sending control signals to one or more devices or systems in the environment, a means for, in response to the indication of normal or anomalous motion path indicating that the motion path is anomalous and at least one previously generated indication of normal or anomalous motion path indicating that at least one previous motion path is anomalous, sending a notification to a user associated with the environment that the field of view of the camera has changed, a means for receiving, from multiple cameras in the environment, videos of fields of view of the multiple cameras, wherein the camera is one of the multiple cameras, a means for detecting persons in the additional videos, a means for tracking motion of the persons in the videos to generate additional motion paths, a means for receiving additional contextual data for the additional motion paths, a means for storing the motion path, additional motion paths, contextual data, and additional contextual data in an inter-camera training data set, a means for generating an inter-camera model for the multiple cameras and fields of view by inputting the inter-camera training data set to the machine learning system, a means for storing the inter-camera model for the multiple cameras and the fields of view, a means for receiving additional videos from two or more of the multiple cameras, a means for detecting persons in the additional videos, a means for tracking motion of the persons in the additional videos to generate additional motion paths, a means for receiving additional contextual data for the additional motion paths, a means for generating indications of normal or anomalous motion paths for the additional motion paths by inputting the additional motion paths and the additional contextual data to the machine learning system wherein the machine learning system uses the inter-camera model for the multiple cameras and the fields of view, a means for receiving, from a second camera in the environment, video of a field of view of the second camera, a means for detecting a person in the video of the field of view of the second camera, a means for tracking motion of the person in the video of the field of view of the second camera to generate a second motion path, a means for receiving second contextual data for the second motion path, a means for storing the second motion path and second contextual data in a second camera training data set, a means for generating a second camera model for the second camera and the field of view of the second camera by inputting the second camera training data set to the machine learning system, and a means for storing the second camera model for the second camera and the field of view of view of the second camera, are included.

Embodiments disclosed herein may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. In some cases, a sensor may operate as multiple sensor types sequentially or concurrently, such as where a temperature sensor is used to detect a change in temperature, as well as the presence of a person or animal.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 8:
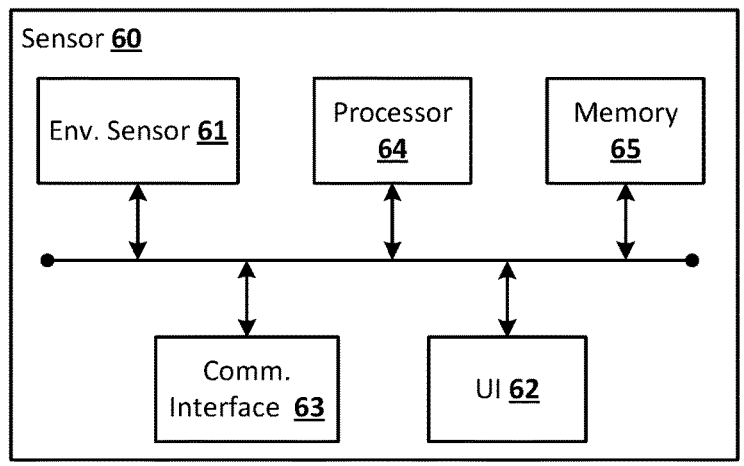
FIG. 8 shows a computing device according to an embodiment of the disclosed subject matter.

A sensor may include hardware in addition to the specific physical sensor that obtains information about the environment. FIG. 8 shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network, that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 9:
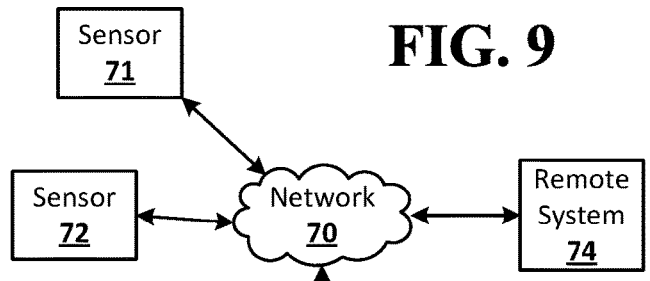
FIG. 9 shows a system according to an embodiment of the disclosed subject matter.

FIG. 9 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

For example, the hub computing device 155 may be an example of a controller 73 and the sensors 210 may be examples of sensors 71 and 72, as shown and described in further detail with respect to FIGS. 1-10.

The devices of the security system and smart-home environment of the disclosed subject matter may be communicatively connected via the network 70, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in the security system of the disclosed subject matter, may avoid communication using a single device. That is, in the mesh-type network, such as network 70, there is no single point of communication that may fail so as to prohibit devices coupled to the network from communicating with one another.

The communication and network protocols used by the devices communicatively coupled to the network 70 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

The Thread network, such as network 70, may be easy to set up and secure to use. The network 70 may use an authentication scheme, AES (Advanced Encryption Standard) encryption, or the like to reduce and/or minimize security holes that exist in other wireless protocols. The Thread network may be scalable to connect devices (e.g., 2, 5, 10, 20, 50, 100, 150, 200, or more devices) into a single network supporting multiple hops (e.g., so as to provide communications between devices when one or more nodes of the network is not operating normally). The network 70, which may be a Thread network, may provide security at the network and application layers. One or more devices communicatively coupled to the network 70 (e.g., controller 73, remote system 74, and the like) may store product install codes to ensure only authorized devices can join the network 70. One or more operations and communications of network 70 may use cryptography, such as public-key cryptography.

The devices communicatively coupled to the network 70 of the smart-home environment and/or security system disclosed herein may low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 70 may use the power-efficient IEEE 802.15.4 MAC/PHY protocol. In embodiments of the disclosed subject matter, short messaging between devices on the network 70 may conserve bandwidth and power. The routing protocol of the network 70 may reduce network overhead and latency. The communication interfaces of the devices coupled to the smart-home environment may include wireless system-on-chips to support the low-power, secure, stable, and/or scalable communications network 70.

The sensor network shown in FIG. 9 may be an example of a smart-home environment. The depicted smart-home environment may include a structure, a house, office building, garage, mobile home, or the like. The devices of the smart environment, such as the sensors 71, 72, the controller 73, and the network 70 may be integrated into a smart-home environment that does not include an entire structure, such as an apartment, condominium, or office space.

The smart environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 9 may include a plurality of devices, including intelligent, multi-sensing, network-connected devices that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 9.

According to embodiments of the disclosed subject matter, the smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 9, and the controller 73 may control the HVAC system (not shown) of the structure.

A smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 9, and the controller 73 may control an alarm system to provide a visual and/or audible alarm to the user of the smart-home environment.

A smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIG. 9 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be the sensors 71, 72 shown in FIG. 9. The smart wall switches may detect ambient lighting conditions, and control a power and/or dim state of one or more lights. For example, the sensors 71, 72, may detect the ambient lighting conditions, and the controller 73 may control the power to one or more lights (not shown) in the smart-home environment. The smart wall switches may also control a power state or speed of a fan, such as a ceiling fan. For example, sensors 72, 72 may detect the power and/or speed of a fan, and the controller 73 may adjusting the power and/or speed of the fan, accordingly. The smart wall plugs may control supply of power to one or more wall plugs (e.g., such that power is not supplied to the plug if nobody is detected to be within the smart-home environment). For example, one of the smart wall plugs may controls supply of power to a lamp (not shown).

In embodiments of the disclosed subject matter, the smart-home environment may include one or more intelligent, multi-sensing, network-connected entry detectors (e.g., "smart entry detectors"). The sensors 71, 72 shown in FIG. 9 may be the smart entry detectors. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIG. 9 can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of the smart-home environment (e.g., as illustrated as sensors 71, 72 of FIG. 9 can be communicatively coupled to each other via the network 70, and to the controller 73 and/or remote system 74 to provide security, safety, and/or comfort for the smart environment).

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment "learns" who is a user (e.g., an authorized user) and permits the electronic devices associated with those individuals to control the network-connected smart devices of the smart-home environment (e.g., devices communicatively coupled to the network 70). Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

The smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event, any of the network-connected smart devices, such as smart wall plugs located outdoors, detect movement at night time, the controller 73 and/or remote system 74 can activate the outdoor lighting system and/or other lights in the smart-home environment.

Figure 12:
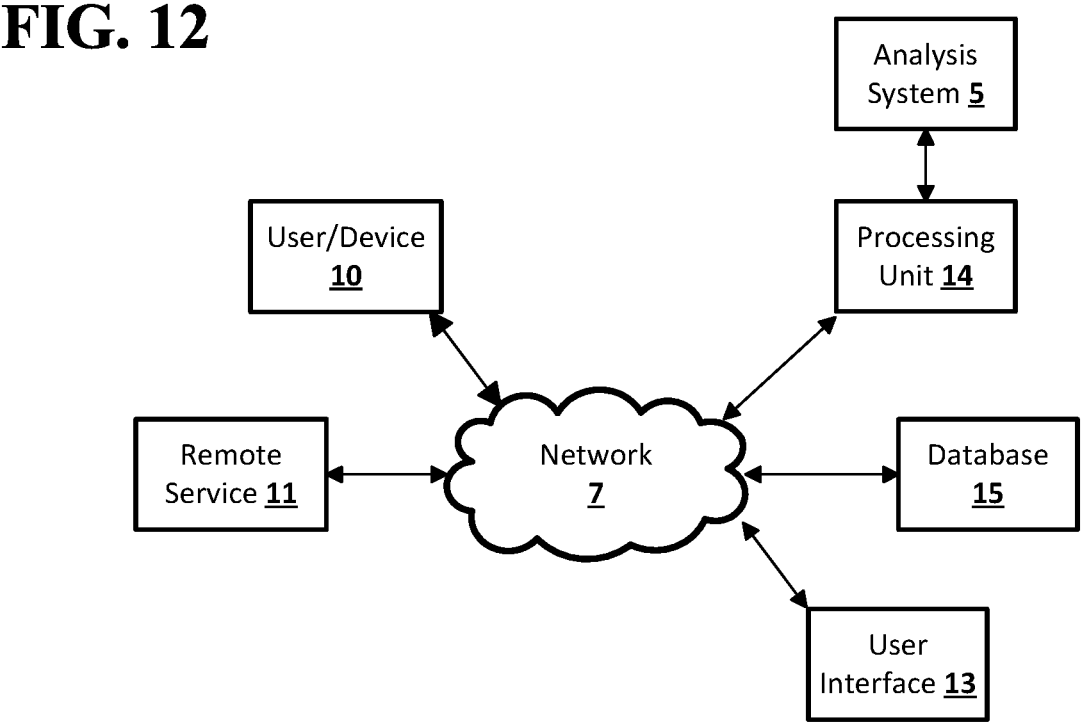
FIG. 12 shows a network configuration according to an embodiment of the disclosed subject matter.

In some configurations, a remote system 74 may aggregate data from multiple locations, such as multiple buildings, multi-resident buildings, individual residences within a neighborhood, multiple neighborhoods, and the like. In general, multiple sensor/controller systems 81, 82 as previously described with respect to FIG. 12 may provide information to the remote system 74. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. Thus, the user may have control over how information is collected about the user and used by a system as disclosed herein.

Figure 11:
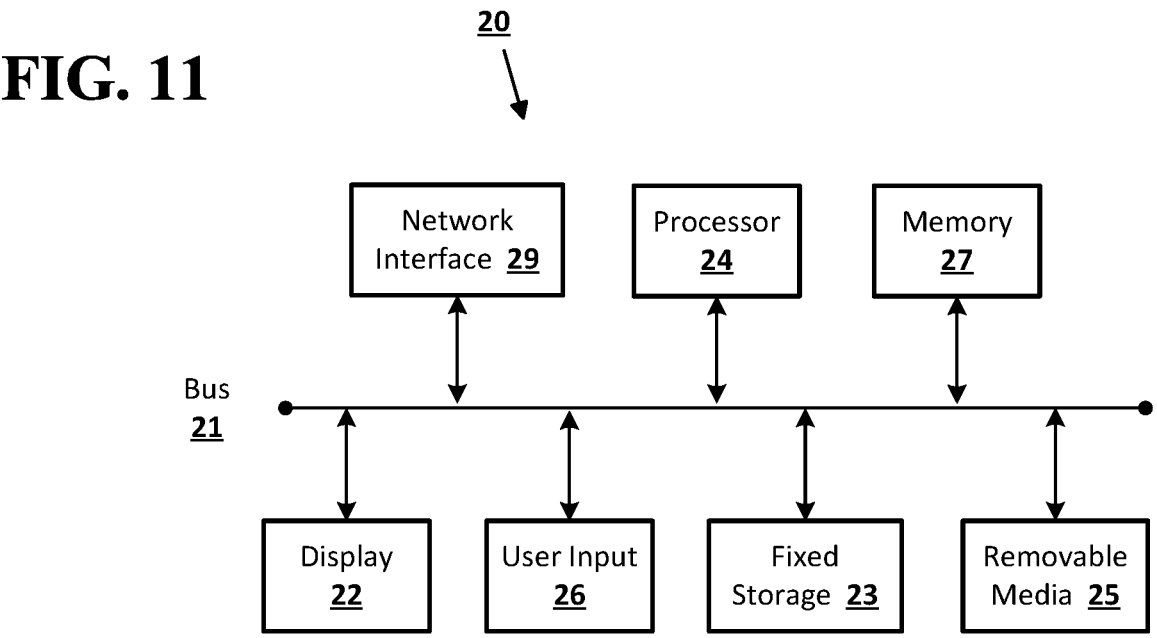
FIG. 11 shows a computer according to an embodiment of the disclosed subject matter.

Embodiments of the presently disclosed subject matter may be implemented in and used with a variety of computing devices. FIG. 11 is an example computing device 20 suitable for implementing embodiments of the presently disclosed subject matter. For example, the device 20 may be used to implement a controller, a device including sensors as disclosed herein, or the like. Alternatively or in addition, the device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the device to communicate with other computers via one or more local, wide-area, or other communication networks, as described in further detail herein.

Figure 10:
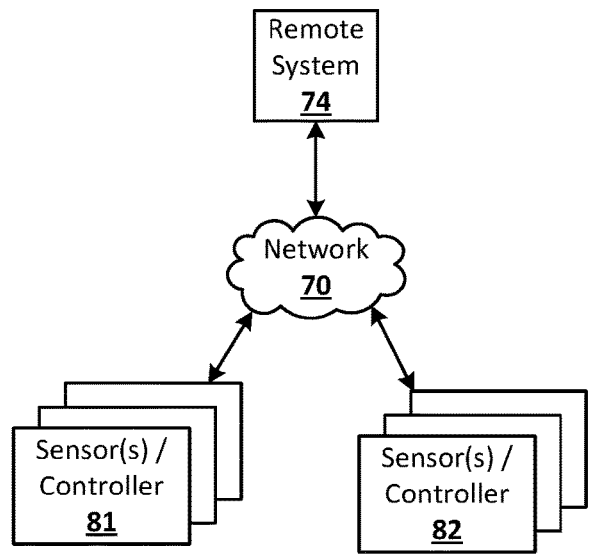
FIG. 10 shows a system according to an embodiment of the disclosed subject matter.

FIG. 10 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus comprising:
  receiving, from multiple cameras in an environment, videos of fields of view of the multiple cameras;
  detecting persons in the videos;
  tracking motion of the persons in the videos to generate motion paths;
  receiving contextual data for the motion paths;
  storing the motion paths, and contextual data for the motion paths in an inter-camera training data set;
  generating an inter-camera model for the multiple cameras and fields of view by inputting the inter-camera training data set to the machine learning system; and
  storing the inter-camera model for the multiple cameras and the fields of view.

2. The computer-implemented method of claim 1, further comprising:
  receiving, from a camera in the environment, video of a field of view of the camera;
  detecting a person in the video;
  tracking motion of the person in the video to generate a motion path;
  receiving contextual data for the motion path;

storing the motion path and contextual data in a camera training data set;
generating a camera model for the camera and the field of view by inputting the camera training data set to a machine learning system; and
storing the camera model for the camera and the field of view.

3. The computer-implemented method of claim 2, further comprising:
receiving, from the camera, additional video of the field of view of the camera;
detecting a person in the additional video;
tracking motion of the person in the additional video to generate a second motion path;
receiving second contextual data for the second motion path; and
generating an indication of normal or anomalous motion path for the second motion path by inputting the second motion path and the second contextual data to the machine learning system wherein the machine learning system uses the camera model for the camera and the field of view.

4. The computer-implemented method of claim 3, further comprising, in response to the indication of normal or anomalous motion path indicating that the motion path is anomalous, one or more of sending a notification that the motion path is anomalous to a user associated with the environment, sending a notification that the motion path is anomalous to a cloud computing system or hub computing device of the environment, and generating and sending control signals to one or more devices or systems in the environment.

5. The computer-implemented method of claim 3, further comprising:
in response to the indication of normal or anomalous motion path indicating that the motion path is anomalous and at least one previously generated indication of normal or anomalous motion path indicating that at least one previous motion path is anomalous, sending a notification to a user associated with the environment that the field of view of the camera has changed.

6. The computer-implemented method of claim 1, further comprising:
receiving additional videos from two or more of the multiple cameras;
detecting persons in the additional videos;
tracking motion of the persons in the additional videos to generate additional motion paths;
receiving additional contextual data for the additional motion paths; and
generating indications of normal or anomalous motion paths for the additional motion paths by inputting the additional motion paths and the additional contextual data to the machine learning system wherein the machine learning system uses the inter-camera model for the multiple cameras and the fields of view.

7. The computer-implemented method of claim 2, further comprising:
receiving, from a second camera in the environment, video of a field of view of the second camera;
detecting a person in the video of the field of view of the second camera;
tracking motion of the person in the video of the field of view of the second camera to generate a second motion path;
receiving second contextual data for the second motion path;
storing the second motion path and second contextual data in a second camera training data set;
generating a second camera model for the second camera and the field of view of the second camera by inputting the second camera training data set to the machine learning system; and
storing the second camera model for the second camera and the field of view of view of the second camera.

8. The computer-implemented method of claim 1, wherein tracking motions of the persons in the video to generate the motion paths comprises generating sequences of coordinates for locations of the persons in sequential frames of the videos or generating images of paths of the persons through the fields of view of the multiple cameras.

9. The computer-implemented method of claim 1, wherein the contextual data for a motion path of the motion paths comprises one or more of time of day, date, identification of the person, the length of the motion path in the field of view, and the time span the motion path is in the field of view.

10. A computer-implemented system for anomalous path detection within a camera's fields of view comprising: a computing devices that receives, from multiple cameras in the environment, videos of fields of view of the multiple cameras,
detects persons in the videos,
tracks motion of the persons in the videos to generate motion paths,
receives contextual data for the motion paths,
stores the motion paths, and contextual data for the motion paths in an inter-camera training data set,
generates an inter-camera model for the multiple cameras and fields of view by inputting the inter-camera training data set to the machine learning system, and
stores the inter-camera model for the multiple cameras and the fields of view.

11. The computer-implemented system of claim 10 wherein the computing device further:
receives, from a camera in the environment, video of a field of view of the camera,
detects a person in the video,
tracks motion of the person in the video to generate a motion path,
receives contextual data for the motion path,
stores the motion path and contextual data in a camera training data set,
generates a camera model for the camera and the field of view by inputting the camera trains data set to a machine learning system, and
stores the camera model for the camera and the field of view.

12. The computer-implemented system of claim 11, wherein the computing device further receives, from the camera, additional video of the field of view of the camera,
detects a person in the additional video,
tracks motion of the person in the additional video to generate a second motion path,
receives second contextual data for the second motion path, and
generates an indication of normal or anomalous motion path for the second motion path by inputting the second motion path and the second contextual data to the machine learning system wherein the machine learning system uses the camera model for the camera and the field of view.

13. The computer-implemented system of claim 12, wherein the computing device, in response to the indication of normal or anomalous motion path indicating that the motion path is anomalous, performs one or more of sending a notification that the motion path is anomalous to a user associated with the environment, sending a notification that the motion path is anomalous to a cloud computing system or hub computing device of the environment, and generating and sending control signals to one or more devices or systems in the environment.

14. The computer-implemented system of claim 12, wherein the computing device, in response to the indication of normal or anomalous motion path indicating that the motion path is anomalous and at least one previously generated indication of normal or anomalous motion path indicating that at least one previous motion path is anomalous, sends a notification to a user associated with the environment that the field of view of the camera has changed.

15. The computer-implemented system of claim 10, wherein the computing device further receives additional videos from two or more of the multiple cameras,
   detects persons in the additional videos,
   tracks motion of the persons in the additional videos to generate additional motion paths,
   receives additional contextual data for the additional motion paths, and
   generates indications of normal or anomalous motion paths for the additional motion paths by inputting the additional motion paths and the additional contextual data to the machine learning system wherein the machine learning system uses the inter-camera model for the multiple cameras and the fields of view.

16. The computer-implemented system of claim 11, wherein the computing device further receives, from a second camera in the environment, video of a field of view of the second camera,
   detects a person in the video of the field of view of the second camera,
   tracks motion of the person in the video of the field of view of the second camera to generate a second motion path,
   receives second contextual data for the second motion path,
   stores the second motion path and second contextual data in a second camera training data set,
   generates a second camera model for the second camera and the field of view of the second camera by inputting the second camera training data set to the machine learning system, and
   stores the second camera model for the second camera and the field of view of view of the second camera.

17. The computer-implemented system of claim 10, wherein the computing device tracks motion of the persons in the videos to generate the motion paths by generating sequences of coordinates for locations of the persons in sequential frames of the videos or generating images of paths of the persons through the fields of view of the multiple camera.

18. The computer-implemented method of claim 10, wherein the contextual data for a motion path of the motion paths comprises one or more of time of day, date, identification of the person, the length of the motion path in the field of view, and the time span the motion path is in the field of view.

19. A system comprising: one or more computers and one or more storage devices storing instructions which are operable, when executed by the one or more computers, to cause the one or more computers to perform operations comprising:
   receiving, from multiple cameras in an environment, videos of fields of view of the multiple cameras;
   detecting persons in the videos;
   tracking motion of the persons in the videos to generate motion paths;
   receiving contextual data for the motion paths;
   storing the motion paths, and contextual data for the motion paths in an inter-camera training data set;
   generating an inter-camera model for the multiple cameras and fields of view by inputting the inter-camera training data set to the machine learning system; and
   storing the inter-camera model for the multiple cameras and the fields of view.

20. The system of claim 19, wherein the instructions further cause the one or more computers to perform operations comprising:
   receiving, from a camera in the environment, video of a field of view of the camera;
   detecting a person in the video;
   tracking motion of the person in the video to generate a motion path;
   receiving contextual data for the motion path;
   storing the motion path and contextual data in a camera training data set;
   generating a camera model for the camera and the field of view by inputting the camera training data set to a machine learning system; and
   storing the camera model for the camera and the field of view.

* * * * *